(12) United States Patent
Verma et al.

(10) Patent No.: US 12,532,216 B2
(45) Date of Patent: Jan. 20, 2026

(54) RESOURCE ALLOCATION FOR LOW LATENCY WIRELESS COMMUNICATION

(71) Applicant: Apple Inc., Cupertino, CA (US)

(72) Inventors: Lochan Verma, Danville, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 328 days.

(21) Appl. No.: 18/238,458

(22) Filed: Aug. 25, 2023

(65) Prior Publication Data

US 2024/0107369 A1 Mar. 28, 2024

Related U.S. Application Data

(60) Provisional application No. 63/409,651, filed on Sep. 23, 2022.

(51) Int. Cl.
*H04W 28/02* (2009.01)
*H04W 72/566* (2023.01)

(52) U.S. Cl.
CPC ..... *H04W 28/0278* (2013.01); *H04W 72/569* (2023.01)

(58) Field of Classification Search
CPC .......... H04W 28/0278; H04W 72/569
See application file for complete search history.

(56) References Cited

U.S. PATENT DOCUMENTS

2006/0285515 A1 12/2006 Julian et al.

| | | | |
|---|---|---|---|
| 2008/0119181 A1 | 5/2008 | Suzuki et al. | |
| 2009/0285104 A1* | 11/2009 | Tseng | H04W 72/21 370/241 |
| 2009/0303954 A1* | 12/2009 | Guo | H04W 72/56 455/450 |

(Continued)

FOREIGN PATENT DOCUMENTS

EP 3687244 7/2020

OTHER PUBLICATIONS

IEEE P802.11be: IEEE Draft Standard for Information technology—Telecommunications and information exchange between systems Local and metropolitan area networks—Specific requirements—Part 11: Wireless LAN Medium Access Control (MAC) and Physical Layer (PHY) Specifications Amendment: Enhancements for Extremely High Throughput (EHT), Summary of changes, Mar. 2019, retrieved from https://standards.ieee.org/ieee/802.11be/7516/.

(Continued)

*Primary Examiner* — Ajay Cattungal
(74) *Attorney, Agent, or Firm* — BAKERHOSTETLER

(57) ABSTRACT

The subject disclosure provides systems and methods for improved medium access for wireless communication. A wireless access point, on contending for and gaining medium access, may share a time and/or bandwidth channel resource with one or more other wireless access points and/or one or more client devices. The wireless access point can efficiently share the channel resource using buffer status information computed by the wireless access point and/or additional buffer status information computed by the one or more other wireless access points. In one or more implementations, latency information for buffered data can be provided from a client device to a wireless access point and/or from a satellite wireless access point to a control wireless access point.

20 Claims, 13 Drawing Sheets

(56) References Cited

U.S. PATENT DOCUMENTS

| | | | |
|---|---|---|---|
| 2012/0052894 A1* | 3/2012 | Manssour | H04W 72/121 |
| | | | 455/509 |
| 2016/0100424 A1* | 4/2016 | Yang | H04W 72/54 |
| | | | 370/252 |
| 2018/0014803 A1 | 1/2018 | Schneider | |
| 2019/0159236 A1 | 5/2019 | Xu et al. | |
| 2020/0045577 A1* | 2/2020 | Yu | H04W 72/1268 |
| 2020/0145881 A1* | 5/2020 | Mitra | H04W 28/0278 |
| 2020/0404541 A1* | 12/2020 | Mitra | H04W 4/40 |
| 2022/0295511 A1* | 9/2022 | Han | H04W 72/02 |
| 2023/0189041 A1* | 6/2023 | Lee | H04W 24/10 |
| | | | 370/235 |
| 2024/0015572 A1* | 1/2024 | Wang | H04W 28/0278 |

OTHER PUBLICATIONS

Khorov, et al., "Current Status and Directions of IEEE 802.11be, the Future and Wi-Fi 7," IEEE Access, May 2020, pp. 88664-88688, retrieved from https://ieeexplore.ieee.org/stamp/stamp.jsp?tp=&arnumber=9090146.

International Search Report and Written Opinion from PCT/US2023/033185, dated Jan. 23, 2024, 18 pages.

Invitation to Pay Additional Fees from PCT/US2023/033185, dated Dec. 1, 2023, 13 pages.

* cited by examiner

US 12,532,216 B2

RESOURCE ALLOCATION FOR LOW LATENCY WIRELESS COMMUNICATION

CROSS REFERENCE TO RELATED APPLICATIONS

This application claims the benefit of priority to U.S. Provisional Patent Application No. 63/409,651, entitled, "RESOURCE ALLOCATION FOR LOW LATENCY WIRELESS COMMUNICATION", filed on Sep. 23, 2022, the disclosure of which is hereby incorporated herein in its entirety.

TECHNICAL FIELD

The present description relates generally to wireless communication, including, for example, resource allocation for low latency wireless communication.

BACKGROUND

Electronic devices often communicate over wireless networks using WiFi protocols defined by the 802.11 standards.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In a wireless communication system, such as a WiFi network, a wireless access point (AP) allocates uplink (UL) and/or downlink (DL) channel resources to one or more client devices, by which the one or more client devices can transmit and receive data. In one or more use cases, a wireless access point can perform Multi User (MU) operations in which the AP communicates concurrently with multiple client devices in its basic service set (BSS). In one or more use cases, multi-link operations (MLO) can be performed in which an AP can communicate with a client device in its BSS concurrently via multiple links over multiple channels and/or frequency bands.

MU and MLO operations can provide benefits, such as increasing throughput, reducing latency, and improving reliability for wireless communication between devices. Latency reductions can be particularly helpful in use cases such as augmented reality, virtual reality, industrial automation, gaming, and/or other applications in which low latency is beneficial or necessary.

Aspects of the subject technology can provide further improvements in low latency wireless communication, beyond those provided by MU and MLO operations. In one or more implementations of the subject technology, improved performance for wireless communication can be provided using a collaborative multi-AP (CoMAP) architecture as described herein. For example, CoMAP architectures described in further detail hereinafter can allow for a BSS and an overlapping BSS (OBSS) to coordinate for multiplexed access to a wireless medium. In one or more implementations, CoMAP can be implemented as wrapper on top of existing UL MU and MLO techniques. Various examples are described herein of both (a) CoMAP architectures and (b) resource allocation procedures in CoMAP for multiplexed transmissions.

In one or more implementations of the subject technology, improved performance for wireless communication can also be provided, in single AP and/or multi-AP (e.g., CoMAP) architectures, by providing latency guidance and/or feedback to an AP for allocation of channel resources, as described in further detail hereinafter.

Figure 1:
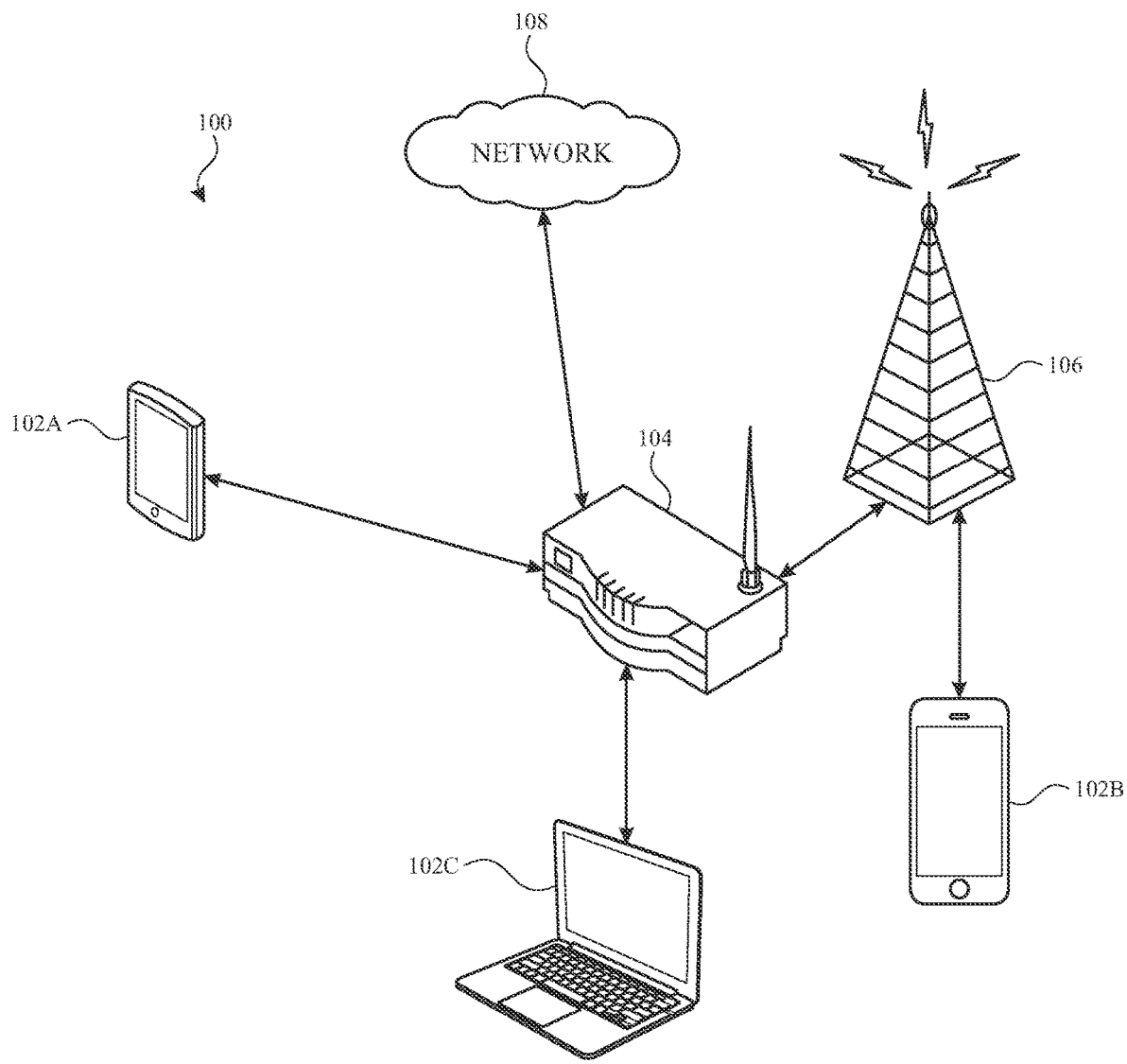
FIG. 1 illustrates an example network environment in accordance with one or more implementations.

FIG. 1 illustrates an example network environment 100 for wireless communication in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-102C, a wireless access point 104, and a base station 106. One or more of the electronic devices 102A-102C may include, may be a component of, and/or may be referred to as, a User Equipment (UE), station (STA), a client device, or terminal device. One or more of the electronic devices 102A-102C may include suitable logic, circuitry, interfaces, memory, and/or code that enables communications, e.g., with one or more of the wireless access point 104 or the base station 106, via wireless interfaces and utilizing one or more radio transceivers, such as WiFi and/or cellular transceivers. One or more of the electronic devices 102A-102C may also be operable to communicate wirelessly with one or more other user devices, one or more other base stations, and/or one or more other access points not shown in FIG. 1.

One or more of the electronic devices 102A-102C may be, for example, a portable computing device such as a laptop device, a smartphone, a peripheral device (e.g., a digital camera, headphones), a smart television device, a tablet device, a wearable device such as a watch, a band, and the like, or any other appropriate device that includes, for example, one or more wireless interfaces, such as wireless local area network (WLAN) radios, Wi-Fi radios, cellular radios, Bluetooth radios, Zigbee radios, near field communication (NFC) radios, and/or other wireless radios. In FIG. 1, by way of example, the electronic device 102A is depicted as a tablet device, the electronic device 102B is depicted as a mobile device, and the electronic device 102C is depicted as a laptop device. One or more of the electronic devices 102A-102C may be, and/or may include all or part of, the electronic device discussed below with respect to FIG. 2, and/or the electronic system discussed below with respect to FIG. 16.

The base station 106 may be a component of, and/or may be referred to as, a cell, a node B (NB), an evolved universal mobile telecommunications system (UMTS) terrestrial radio access network (E-UTRAN) node B, an evolved nodeB (eNodeB or eNB), and the like. The base station 106 may include suitable logic, circuitry, interfaces, memory, and/or code that enable cellular communications, e.g., with one or more of the electronic devices 102A-102C and/or other base stations (not shown), via wireless interfaces and utilize one or more radio transceivers.

In one or more implementations, the base station 106 may be a base station of a cellular-based wireless network, such as a long term evolution (LTE) communications network, global system for mobile (GSM) communications network, UMTS communications network, or generally any cellular-based communications network. The base station 106 may utilize an unlicensed spectrum for cellular communications, such as in a carrier aggregation procedure, e.g., in licensed assisted access (LAA) communication. Thus, the cellular communications may include communications over licensed spectrum, such as spectrum licensed by the mobile network operator associated with the base station 106, and/or communications over unlicensed spectrum, such as, for example, the 5 GHz spectrum. The base station 106 may be, and/or may include all or part of, the electronic device discussed below with respect to FIG. 2, and/or the electronic system discussed below with respect to FIG. 16.

In the example of FIG. 1, the electronic device 102A and the electronic device 102C are illustrated as participating in WiFi communications with the wireless access point 104. In the example of FIG. 1, the electronic device 102B is illustrated as participating in cellular communications with the base station 106. However, the electronic device 102B may also participate in WiFi communications with the wireless access point 104, such as concurrently with or separately from the cellular communications with the base station 106.

The wireless access point 104 may include, may be a component of, and/or may be referred to as, a WLAN access point or AP. The wireless access point 104 includes suitable logic, circuitry, interfaces, memory, and/or code that enable WiFi communications, e.g., with one or more of the electronic devices 102A-102C via wireless interfaces and utilize one or more radio transceivers. The WiFi communications may include communications over one or more of a 2.4 GHz band, a 5 GHz band, a 6 GHz band, and/or other band utilized for WiFi communications. Within each band, the electronic devices 102A-102C and the wireless access point 104 may communicate over various channels having various channel widths, such as a 20 MHz channel width, a 40 MHz channel width, an 80 MHz channel width, a 160 MHz channel width, a 320 MHz channel width, etc. The wireless access point 104 may be, and/or may include all or part of, the electronic device discussed below with respect to FIG. 2, and/or the electronic system discussed below with respect to FIG. 16. As shown, the wireless access point 104 and/or the base station 106 may be communicatively coupled (e.g., via a wired connection) to a network, such as the network 108. In one or more implementations, the network 108 may be an interconnected network of devices that may include, or may be communicatively coupled to, the Internet.

In the example of FIG. 1, three electronic devices and one AP are shown. However, in various implementations, less than three or more than three electronic devices (e.g., client devices) may be in communication with one, two, three, or more than three APs and/or two or more APs may be in wireless communication with each other and/or the network 108. Additional examples of network architectures with more than one AP are discussed in further detail hereinafter in connection with, for example, FIGS. 3 and 4.

Figure 2:
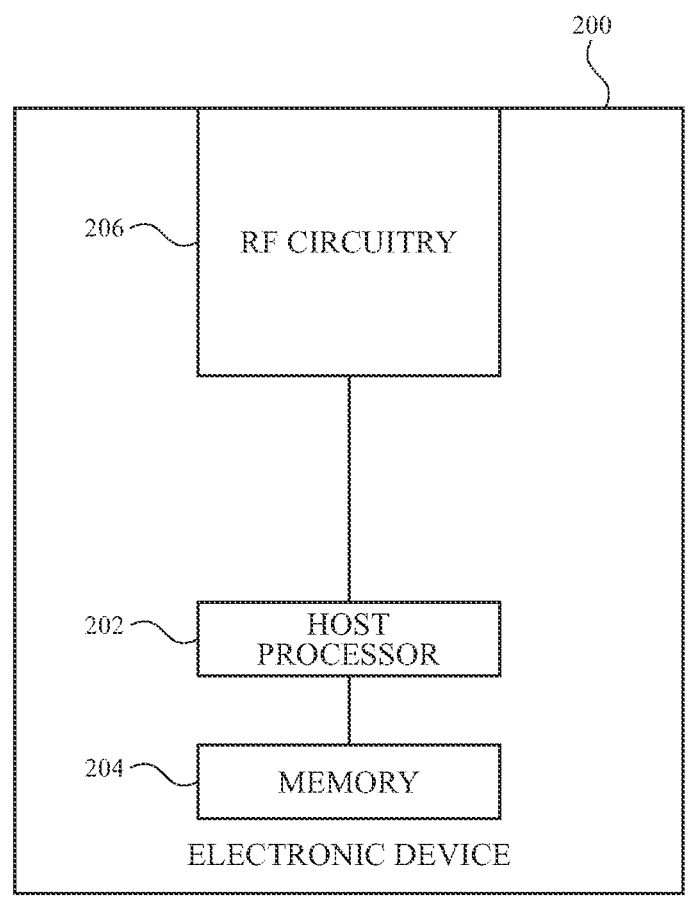
FIG. 2 illustrates an example device that may implement a system for resource allocation for low latency wireless communication in accordance with one or more implementations.

FIG. 2 illustrates an example device that may implement a system for wireless communication in accordance with one or more implementations. For example, the device 200 of FIG. 2 can correspond to any of the electronic devices 102A-102C and/or the wireless access point 104 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein.

Additional components, different components, or fewer components may be provided.

The device 200 may include a processor 202, a memory 204, and a communication interface 206. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102A-102C and/or the wireless access point 104 of FIG. 1, the memory 204 may store applications and/or services for generating data streams and/or for generating and providing communication to others of the electronic devices 102A-102C and/or the wireless access point 104 of FIG. 1 and/or for receiving and/or processing communication from others of the electronic devices 102A-102C and/or the wireless access point 104 of FIG. 1. In one or more implementations, the memory 204 may store instructions for determining a signal strength according to the subject matter described herein.

The communication interface 206 may include suitable logic, circuitry, and/or code that enables wired or wireless communication, such as between any of the electronic devices 102A-102C, the AP 104, and/or the base station 106. The communication interface 206 may include radio frequency (RF) circuitry. The communication interface 206 may include, for example, one or more of a Bluetooth communication interface, a cellular interface, an NFC interface, a Zigbee communication interface, a WLAN communication interface, a WiFi communication interface, a USB communication interface, or generally any communication interface. The communication interface 206 may include circuitry configured to transmit and/or receive signals (e.g., control signals, data signals). Such signals may be encoded with information implementing any one of the methods described herein. The processor 202 may be operably coupled to the communication interface 206 and configured to receive from and/or transmit signals to the communication interface 206. The processor 202 may be configured to encode and/or decode signals (e.g., signaling from an AP, signaling from a client device) for implementing any one of the methods described herein.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
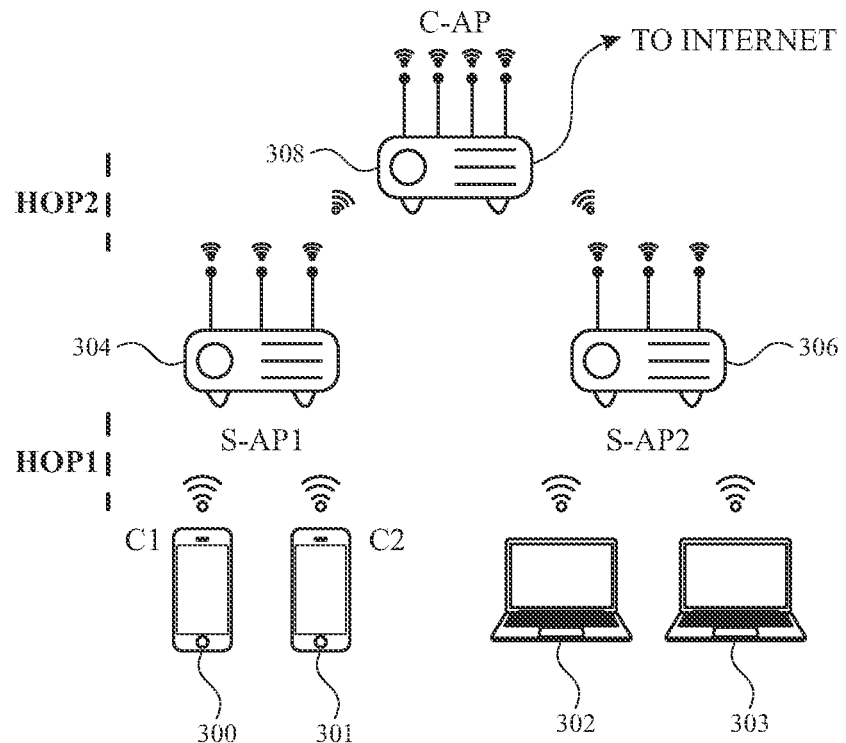
FIG. 3 illustrates an example collaborative multi-access point (CoMAP) architecture in accordance with one or more implementations.

FIG. 3 illustrates an example architecture in which multi-AP (e.g., CoMAP) wireless communication can be performed. In the example of FIG. 3, a wireless access point 308 (referred to herein as a controller AP or C-AP) is connected to the Internet, and in communication with a wireless access point 304 and a wireless access point 306 (referred to herein as satellite APs, or S-APs). As shown, an electronic device 300 and an electronic device 301 are in communication with the wireless access point 304, and an electronic device 302 and an electronic device 303 are in communication with the wireless access point 306. In this example, the wireless access point 308 (e.g., the C-AP) contends for medium access to obtain a transmission opportunity (TXOP). On gaining medium access, the wireless access point 308 may share the channel resource (e.g., at least a portion of the time and/or bandwidth of the TXOP) with the wireless access point 304 and/or the wireless access point 306 (e.g., the S-APs). The wireless access point 304 and/or the wireless access point 306 (e.g., the S-APs) can then allocate parts of the portion of the TXOP received from the wireless access point 308 to the client devices (e.g., electronic device 300, electronic device 301, electronic device 302, and/or the electronic device 303). The electronic device 300, the electronic device 301, the electronic device 302, and/or the electronic device 303 may be implementations of the device 200 of FIG. 2 and/or any of the electronic devices 102A-102C of FIG. 1. The wireless access point 304, the wireless access point 306, and/or the wireless access point 308 may be implementations of the device 200 of FIG. 2 and/or the wireless access point 104 of FIG. 1.

In this example architecture of FIG. 3, the electronic devices 300, 301, 302, and 303 connect to the network via a two hop connection (e.g., including a Hop1 from the client device to an S-AP, and Hop2 from the S-AP to the C-AP). In one or more implementations, the wireless access point 308 can allocate channel resources (e.g., portions of a TXOP) to one or both of the wireless access point 304 and the wireless access point 306 for downlink (DL) and/or uplink (UL) multi-user (MU) communication on Hop1. In one or more implementations, the S-APs (e.g., wireless access point 304 and the wireless access point 306) can allocate channel resources from among the channel resources received from the C-AP to some or all of the electronic device 300, the electronic device 301, the electronic device 302, and/or the electronic device 303 for downlink DL/UL (MU communication on Hop2.

In one or more implementations, the wireless access point 304 and the wireless access point 306 can determine how to allocate channel resources to the electronic device 300, the electronic device 301, the electronic device 302, and/or the electronic device 303. In one or more implementations, the wireless access point 308 can instruct the wireless access point 304 and the wireless access point 306 how to allocate the channel resources to the electronic device 300, the electronic device 301, the electronic device 302, and/or the electronic device 303. In one or more implementations, the S-APs may determine how to allocate channel resources to the client devices based on buffer size information received from the client devices and/or additional buffer size information computed at the S-APs (e.g., as described in further detail in connection with, for example, FIG. 7). In one or more implementations, the C-AP may determine how to allocate channel resources to the S-APs based on buffer size information received from the S-APs and/or additional buffer size information computed at the C-AP (e.g., as described in further detail in connection with, for example, FIG. 7). In one or more implementations, the C-AP and/or the S-APs may allocate channel resources based on latency information (e.g., as described herein in connection with FIGS. 9, 11, 12, 13, and/or 15).

In this example architecture of FIG. 3, the S-APs may connect to the C-AP over wired and/or wireless connections to reach the Internet. In one or more implementations, gateway circuitry for accessing the Internet may be implemented at the C-AP or in communication with the C-AP. The example architecture of FIG. 3 includes one C-AP, two S-APs, and four client devices. However, this is merely illustrative and less or more than two client devices can communication with an S-AP, and/or less or more than two S-APs can communicate with a C-AP in various implementations.

Figure 4:
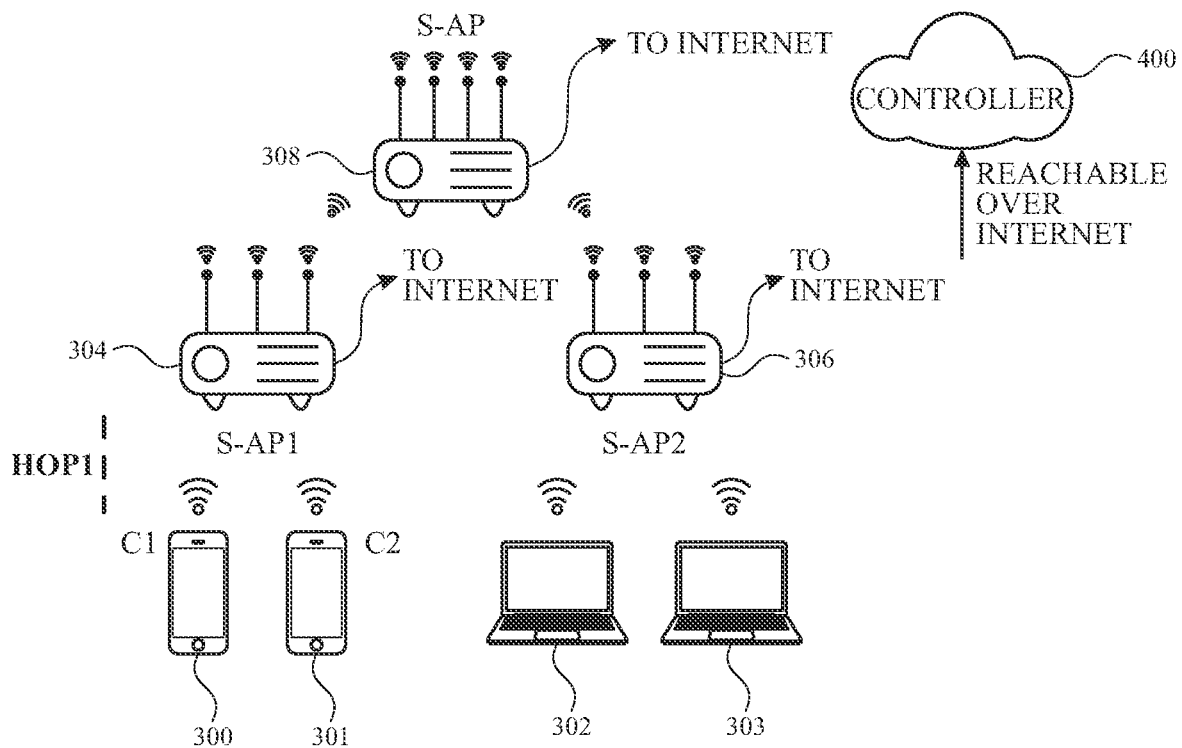
FIG. 4 illustrates another example CoMAP architecture in accordance with one or more implementations.

FIG. 4 illustrates another example architecture in which multi-AP (e.g., CoMAP) wireless communication can be performed. In the example of FIG. 4, the wireless access point 308 (referred to in this example as a S-AP) is connected to the Internet, and in communication with a wireless access point 304 and a wireless access point 306 (referred to herein as satellite APs, or S-APs) as in the example of FIG. 3. However, in the example of FIG. 4, the wireless access point 304 and the wireless access point 306 can also contend for medium access (e.g., and connect to the Internet). In the example of FIG. 4, the wireless access point 304, the wireless access point 306, and the wireless access point 308 may communicate (e.g., via a wired connection) with a controller 400 (e.g., that is accessible via the Internet).

As in the example of FIG. 3, in FIG. 4, the electronic device 300 and the electronic device 301 are in communication with the wireless access point 304, and the electronic device 302 and the electronic device 303 are in communication with the wireless access point 306. In the example of FIG. 4, any or all of the wireless access point 304, the wireless access point 306, and/or the wireless access point 308 contend for medium access to obtain a transmission opportunity (TXOP) and, on gaining medium access, may share the channel resource (e.g., at least a portion of the time and/or bandwidth of the TXOP) with any other(s) of the wireless access point 304, the wireless access point 306, and/or the wireless access point 308 (e.g., according to allocation instructions from the controller 400). The wireless access point 304 and the wireless access point 306 (e.g., the S-APs) can then allocate parts of the self-obtained TXOP, or a portion of a TXOP received from another S-AP, to the client devices (e.g., electronic device 300, electronic device 301, electronic device 302, and/or the electronic device 303).

In this example architecture of FIG. 4, the electronic devices 300, 301, 302, and 303 connect to the network via a one hop connection (e.g., including Hop1 from the client device to the S-AP to which the client device is connected). In this example, the S-APs (e.g., wireless access point 304 and the wireless access point 306) can allocate channel resources from a self-obtained channel resource or from among the channel resources received from another S-AP to some or all of the electronic device 300, the electronic device 301, the electronic device 302, and/or the electronic device 303 for downlink DL/UL MU communication on Hop1. In one or more implementations, the wireless access point 304, the wireless access point 306, and/or the wireless access point 308 can determine how to allocate channel resources to the electronic device 300, the electronic device 301, the electronic device 302, and/or the electronic device 303. In one or more implementations, the controller 400 can instruct the wireless access point 304, the wireless access point 306, and/or the wireless access point 308 how to allocate the channel resources to the other wireless access points and/or the electronic device 300, the electronic device 301, the electronic device 302, and/or the electronic device 303.

In one or more implementations, the S-APs may determine how to allocate channel resources to the client devices based on buffer size information received from the client devices and/or additional buffer size information computed at the S-APs (e.g., as described in further detail in connection with, for example, FIG. 7). In one or more implementations, the controller may determine how to allocate channel resources among the S-APs and/or to the client devices based on buffer size information received from the S-APs and/or additional buffer size information computed at the S-APs (e.g., as described in further detail in connection with, for example, FIG. 8). In one or more implementations, the S-APs may allocate channel resources based on latency information (e.g., as described herein in connection with FIGS. 10, 11, 12, 13, and/or 15).

In this example architecture of FIG. 4, the S-APs may connect to one or more gateways over wired and/or wireless connections to reach the Internet. In one or more implementations, the controller 400 may be a cloud-based controller that is reachable via the Internet. The example architecture of FIG. 4 includes one controller, three S-APs, and four client devices. However, this is merely illustrative and less or more than two client devices can communication with an S-AP, and/or less or more than two S-APs can communicate with one or more controllers in various implementations.

Figure 5:
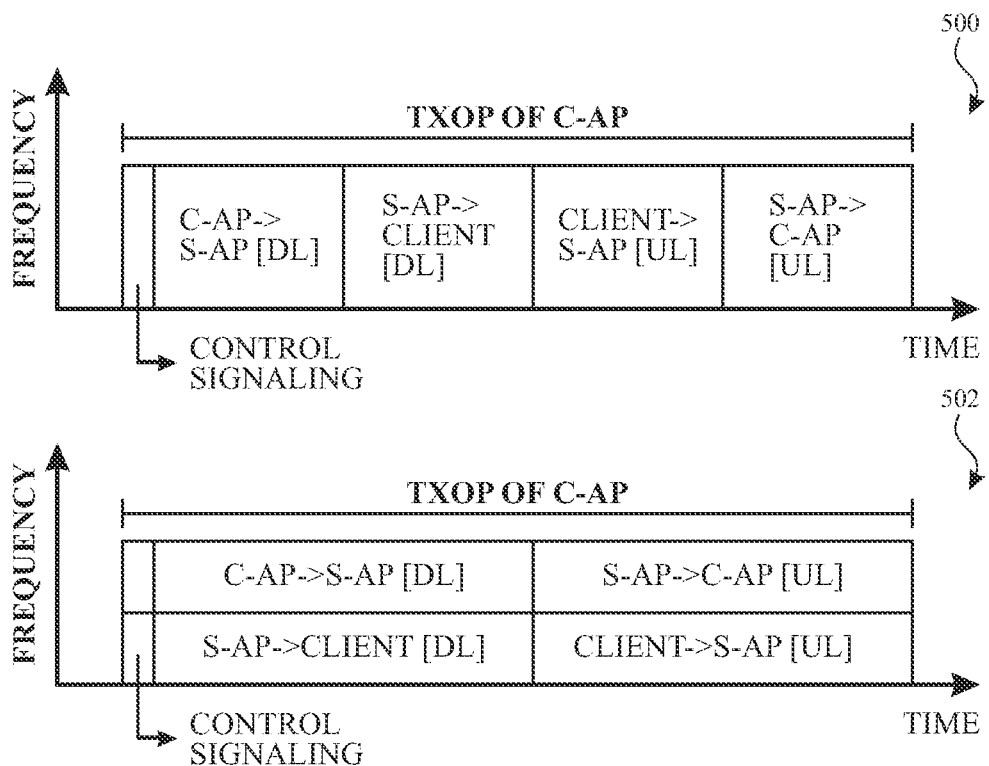
FIG. 5 illustrates examples of time division multiple access (TDMA) and frequency division multiple access (FDMA) allocation of channel resources in the architecture of FIG. 3 in accordance with one or more implementations.
Figure 6:
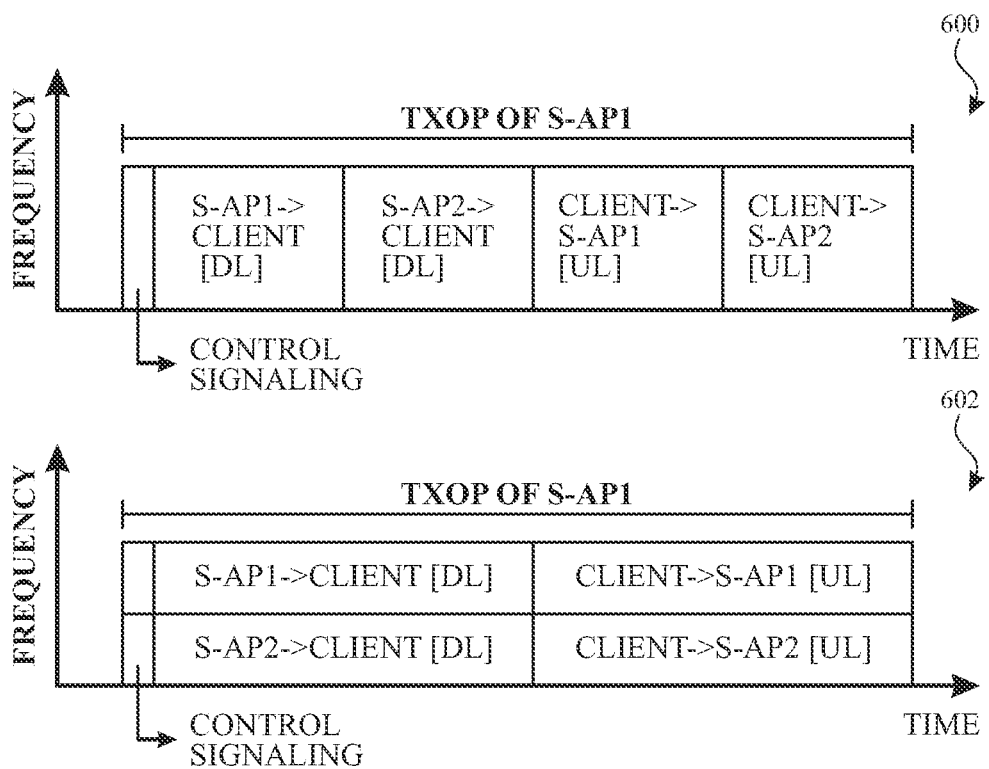
FIG. 6 illustrates examples of TDMA and FDMA allocation of channel resources in the architecture of FIG. 4 in accordance with one or more implementations.

As discussed herein, a wireless access point, such as a C-AP or a S-AP, may allocate a channel resource to one or more other S-APs and/or to one or more client devices. FIG. 5 illustrates examples of how a channel resource (e.g., a TXOP) may be allocated in the architecture of FIG. 3. In the example of FIG. 5, a TDMA allocation 500 and a FDMA allocation 502 of a TXOP won by a C-AP (e.g., the wireless access point 308) are shown, in which time×bandwidth portions of the TXOP are allocated by the C-AP to a S-AP for DL/UL on Hop1 and DL/UL on Hop2. FIG. 6 illustrates examples of how a channel resource (e.g., a TXOP) may be allocated in the architecture of FIG. 4. In the example of FIG. 6, a TDMA allocation 600 and a FDMA allocation 602 of a TXOP won by a S-AP (e.g., the wireless access point 304) are shown, in which time×bandwidth portions of the TXOP are allocated by the S-AP to the S-AP and another S-Ap for DL/UL on Hop1.

Figure 7:
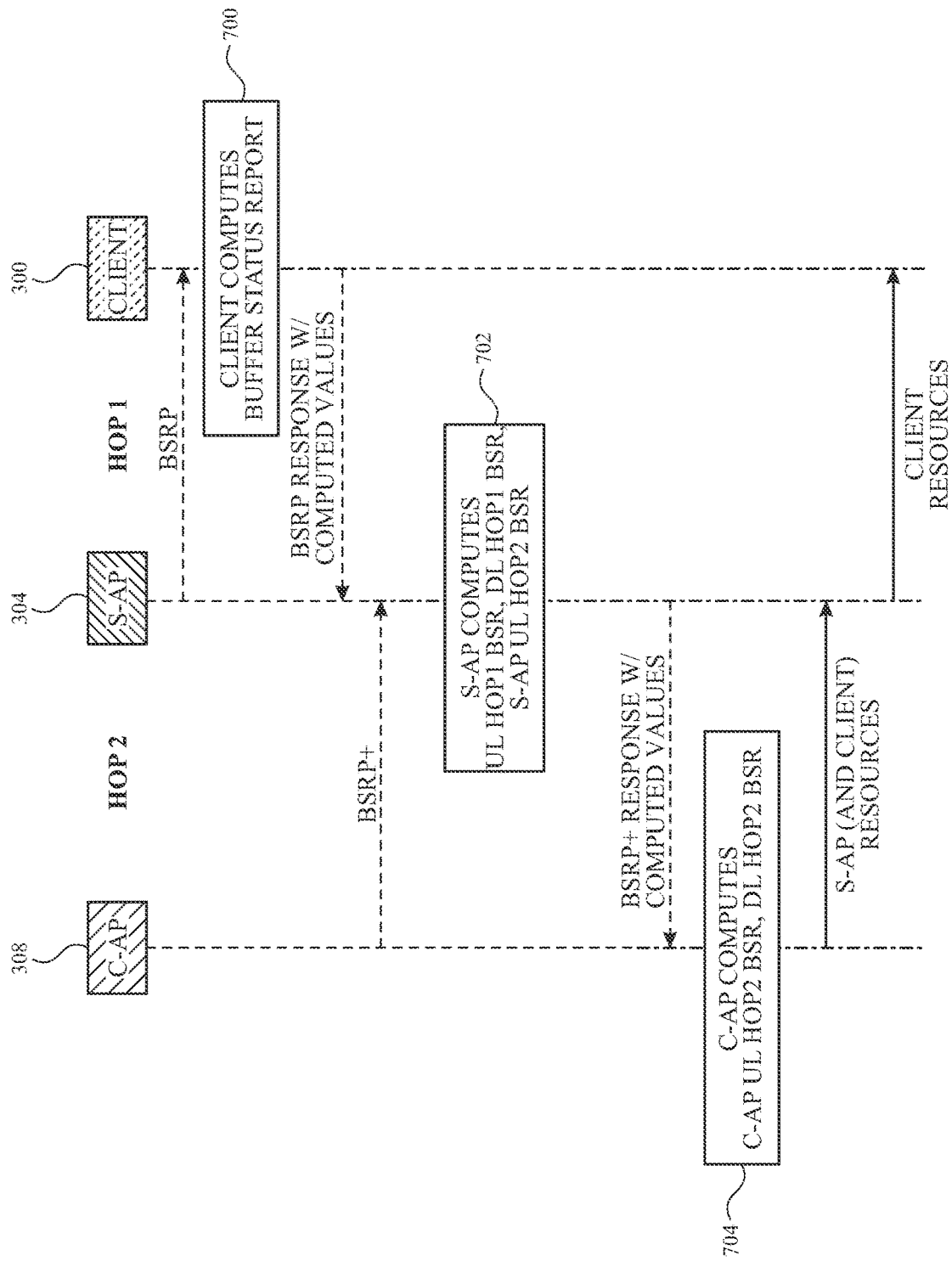
FIG. 7 illustrates an example timing diagram for channel resource allocation operations in the architecture of FIG. 3 in accordance with one or more implementations.

FIG. 7 illustrates a timing diagram showing operations for multi-AP (e.g., CoMAP) operations in the architecture of FIG. 3. As shown in the example of FIG. 7, the wireless access point 304 (e.g., a S-AP) may send a request signal (e.g., a trigger frame such as a buffer status report poll (BSRP)) to a client device, such as the electronic device 300. Responsive to the request signal, the electronic device 300 may compute (700) a buffer status report (BSR) for buffered data for uplink at the electronic device 300, and respond to the request signal with a response signal that includes computed values of the buffer status report. For example, the buffer status report may include buffer information, such as a buffer size (e.g., a Queue Size, or QS) for buffered data of a highest priority access category (e.g., from among a voice access category, a video access category, a best effort access category, and a background access category) at the electronic device 300, and a sum of buffer sizes (e.g., a sum of QSs) for all of the access categories for the electronic device 300. In one or more implementations, the BSR may be included in an A-control field of a communication (e.g., a physical layer protocol data unit (PPDU)) to the wireless access point 304 and/or in one or more quality-of-service (QoS) fields in a PPDU that update the BSR of the access category (AC) to which the QoS field corresponds.

The wireless access point 304 may then receive a request signal (e.g., a trigger frame, such as a BSRP) from the wireless access point 308 and, responsively, compute (702) an uplink Hop1 buffer status report, a downlink Hop1 buffer status report, and an S-AP uplink Hop2 buffer status report. For example, the uplink Hop1 buffer status report may include buffer information, such as (i) a sum of the buffer sizes for the buffered data for uplink in the highest priority access category across all of the client devices (e.g., the electronic device 300 and the electronic device 301) connected to the wireless access point 304 (e.g., first uplink buffer size information for a first access category of multiple access categories for the one or more client devices, the first access category being a high priority access category having a priority that is higher than respective priorities of remaining access categories of the multiple access categories), and/or (ii) a sum of the buffer sizes for the buffered data in all of the access categories across all of the client devices connected to the wireless access point 304 (e.g., second uplink buffer size information for the multiple access categories including the high priority access category for the one or more client devices).

For example, the downlink Hop1 buffer status report may include buffer information, such as (i) a sum of the buffer sizes (e.g., QSs) for buffered data at the wireless access point 304 for downlink in the highest priority access category to all of the client devices (e.g., the electronic device 300 and the electronic device 301) connected to the wireless access point 304 (e.g., first downlink buffer size information for the high priority access category for the one or more client devices), and/or (ii) a sum of the buffer sizes (e.g., QSs) for the buffered data at the wireless access point 304 for downlink in all of the access categories to all of the client devices connected to the wireless access point 304 (e.g., second downlink buffer size information for the multiple access categories including the high priority access category for the one or more client devices). In one or more implementations, the UL Hop1 BSR and the DL Hop1 BSR values may be reported using one or more data structures that include a scaling factor (SF), such as a two-bit scaling factor, and respective unscaled values that, when combined (e.g., multiplied) with the SF, indicate the QS of the voice category, the QS of the video category, the QS of the background category, the QS of the best effort category, and the sum of the QSs over all access categories.

For example, the S-AP uplink Hop2 buffer status report may include buffer information, such as (i) a buffer size (e.g., QS) for buffered data for uplink in the highest priority access category from the wireless access point 304 to the wireless access point 308 (e.g., the C-AP) (e.g., third uplink buffer size information for the high priority access category for the wireless access point), and/or (ii) a sum of the buffer sizes (e.g., QSs) for the buffered data for uplink in all of the access categories from the wireless access point 304 to the wireless access point 308 (e.g., fourth uplink buffer size information for the multiple access categories including the high priority access category for the wireless access point).

As shown in FIG. 7, the wireless access point 304 may transmit, to the wireless access point 308, a response to the request signal (e.g., a BSRP) from the wireless access point 308, the response including the computed values of the UL Hop1 BSR, the DL Hop1 BSR, and the UL Hop2 BSR (e.g., including the first uplink buffer size information, the second uplink buffer size information, the first downlink buffer size information, the second downlink buffer size information, the third uplink buffer size information, and the fourth uplink buffer size information).

The wireless access point 308 may then obtain (704) a C-AP UL Hop2 BSR and a DL Hop2 BSR. For example, the C-AP UL Hop2 BSR may include the buffer information provided in the S-AP UL Hop2 BSR, such as (i) a buffer size (e.g., QS) for buffered data at the wireless access point 304 for uplink (e.g., to the C-AP) in the highest priority access category (e.g., the third uplink buffer size of the high priority access category of the wireless access point), and/or (ii) a sum of the buffer sizes (e.g., QSs) for the buffered data at the wireless access point 304 for uplink in all of the access categories (e.g., the fourth uplink buffer size, such as a sum of uplink buffer sizes of the multiple access categories including the high priority access category at the wireless access point). For example, the DL Hop2 BSR report may be computed by the C-AP and may include buffer information, such as (i) a buffer size (e.g., QS) for buffered data at the wireless access point 308 (e.g., the C-AP) for downlink (e.g., to the wireless access point 304) in the highest priority access category (e.g., a third downlink buffer size of the high priority access category of the wireless access point 308), and/or (ii) a sum of the buffer sizes (e.g., QSs) for the buffered data at the wireless access point 308 for downlink (e.g., to the wireless access point 304) in all of the access categories (e.g., a sum of downlink buffer sizes of the multiple access categories including the high priority access category at the wireless access point 308).

Once the wireless access point 308 has obtained the C-AP UL Hop2 BSR and the DL Hop2 BSR, the wireless access point 308 may contend for channel access to obtain a transmission opportunity, and allocate a portion (e.g., some or all) of the transmission opportunity to the wireless access point 304 based on the C-AP UL Hop2 BSR (e.g., the third uplink buffer size and the fourth uplink buffer size), and the DL Hop2 BSR (e.g., the third downlink buffer size and/or the sum of the downlink buffer sizes).

In one or more implementations, the wireless access point 308 and/or the wireless access point 304 may allocate at least some of the portion of the transmission opportunity to the electronic device 300 based on the UL Hop1 BSR (e.g., the first uplink buffer size information and/or the second uplink buffer size information), the DL Hop1 BSR (e.g., the first downlink buffer size information and/or the second downlink buffer size information), and the S-AP UL Hop2 BSR (e.g., the third uplink buffer size information, and the fourth uplink buffer size information). In one or more implementations, first uplink buffer size information may include a sum of uplink buffer sizes for the high priority access category over all of the one or more client devices, the second uplink buffer size information may include a sum of uplink buffer sizes over all access categories over all of the one or more client devices, the first downlink buffer size information may include a sum of downlink buffer sizes for the high priority access category over all of the one or more client devices, and the second downlink buffer size information may include a sum of downlink buffer sizes over all access categories over all of the one or more client devices.

Figure 8:
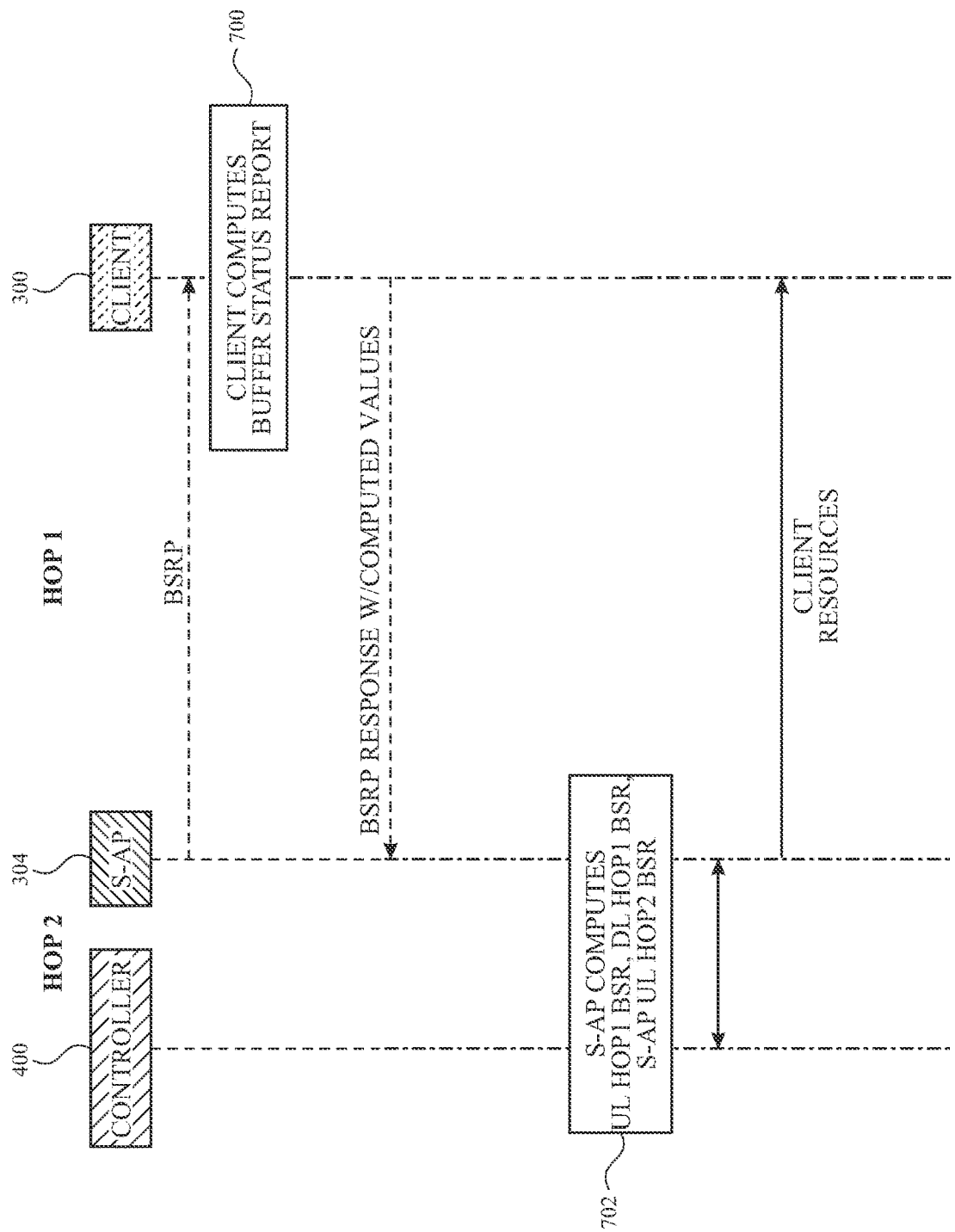
FIG. 8 illustrates an example timing diagram for channel resource allocation operations in the architecture of FIG. 4 in accordance with one or more implementations.

FIG. 8 illustrates a timing diagram showing operations for multi-AP (e.g., CoMAP) operations in the architecture of FIG. 4. As shown in FIG. 8, as in FIG. 7, the electronic device 300 may compute 700 a BSR for the electronic device 300 and send the BSR to the wireless access point 304 in response to a request signal (e.g., a BSRP) from the wireless access point 304. As in FIG. 7, in FIG. 8, the wireless access point 304 may compute an UL Hop1 BSR, a DL Hop1 BSR, and a S-AP UL Hop2 BSR. However, in FIG. 8, the wireless access point 304 contends for channel access to obtain a transmission opportunity, and allocates client resources (e.g., at least a portion of the transmission opportunity) to the electronic device 300 (and/or one or more other client devices) based on the BSR of the electronic device 300, the UL Hop1 BSR, the DL Hop1 BSR, and the S-AP UL Hop2 BSR (e.g., including the first uplink buffer size information, the second uplink buffer size information, the first downlink buffer size information, the second downlink buffer size information, the third uplink buffer size information, and the fourth uplink buffer size information). In one or more implementations, the wireless access point 304 may determine how to allocate the client resources based on the BSR of the electronic device 300, the UL Hop1 BSR, the DL Hop1 BSR, and the S-AP UL Hop2 BSR. In one or more other implementations, the wireless access point 304 may communicate with the controller 400 (e.g., via a wired connection) to determine how to allocate the client resources based on the BSR of the electronic device 300, the UL Hop1 BSR, the DL Hop1 BSR, and the S-AP UL Hop2 BSR (e.g., the controller 400 may determine how to allocate the client resources and may instruct the wireless access point 304 how to allocate the client resources).

The architectures of FIGS. 3 and/or 4, and the operations of FIGS. 7 and/or 8 may provide more Tx/Rx opportunities in BSSs and yield latency reduction (e.g., relative to prior systems using only MU and/or MLO operations). However, in the examples of FIGS. 7 and 8, the buffer information that is provided from the client devices to the S-APs and/or from the S-APs to the C-AP does not include an indication of an amount of urgency in draining the queues/buffers. In the examples of FIGS. 7 and 8, the C-AP (e.g., the wireless access point 308) or the controller 400 may allocate channel resources based on the buffer information and according to a "Drain all AC queues ASAP" or "Drain Priority AC queue ASAP" policy for both Hop1 and Hop2. However, in one or more use cases, a "Drain all AC queues ASAP" or "Drain Priority AC queue ASAP" policy may cause the C-AP (e.g., the wireless access point 308) or the controller (e.g., the controller 400) to aggressively allocate resources in one or more TXOPs to a particular S-AP and withhold resources from other S-APs and their BSSs. This can be inefficient, for example, in use cases in which the S-APs and their BSSs that are receiving less resources have urgent (e.g., latency-sensitive) data and the particular S-AP that is being aggressively drained has lower urgency (e.g., less latency-sensitive) data.

In one or more implementations, latency can be reduced for wireless communication system by a S-AP returning, to a C-AP, a time×bandwidth resource that has been allocated to it by the C-AP ant that will not be used by the S-AP. In this way, the C-AP can determine whether to consume the returned resource itself or allocate the returned resource to another S-AP.

In one or more other implementations (described in further detail hereinafter in connection with, for example, FIGS. 9-13 and 15), the client device(s) and/or the S-AP(s) can generate and communicate latency guidance information that indicates how urgently the buffers at that device are to be drained. The C-AP, controller, and/or S-APs can then allocate channel resources to the other S-APs and/or to the client device(s) using the latency guidance information. In this way, improved network systems can be provided, particularly, for example, for latency-sensitive applications.

Figure 9:
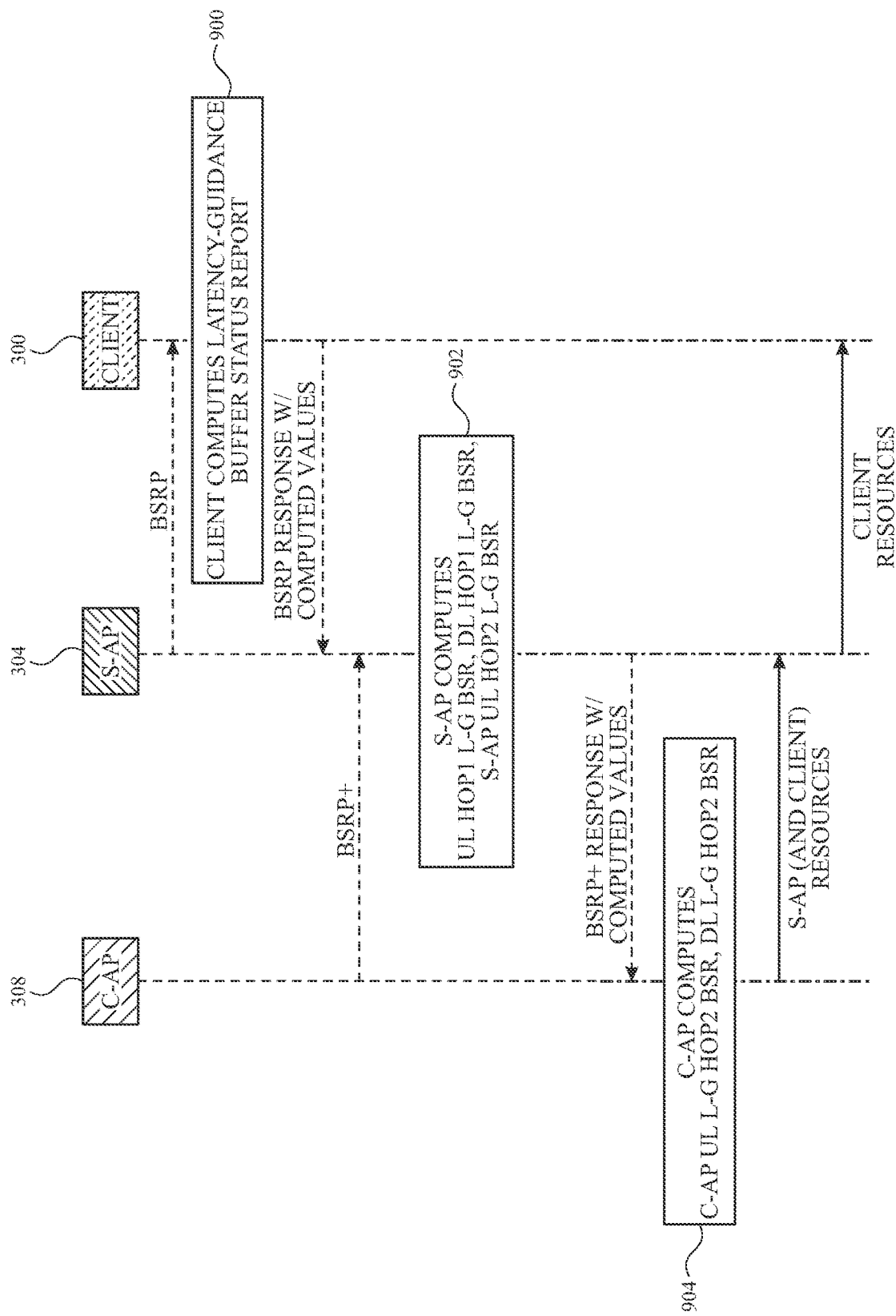
FIG. 9 illustrates an example timing diagram for channel resource allocation operations with latency guidance in the architecture of FIG. 3 in accordance with one or more implementations.

FIG. 9 illustrates a timing diagram showing operations for channel resource allocation with latency guidance, in the example architecture of FIG. 3. As shown in the example of FIG. 9, the wireless access point 304 (e.g., a S-AP) may send a request signal (e.g., a trigger frame, such as a BSRP) to a client device, such as the electronic device 300. Responsive to the request signal, the electronic device 300 may compute (900) a latency-guidance (L-G) buffer status report for buffered data for uplink at the electronic device 300, and respond to the request signal with a response signal that includes computed values of the latency-guidance buffer status report. For example, the latency-guidance buffer status report may include (i) buffer information, such as buffer size information (e.g., a buffer size, such as a Queue Size, or QS) for buffered data for uplink in each access category (e.g., a voice access category, a video access category, a best effort access category, and a background access category) at the electronic device 300, and (ii) latency information (e.g., latency tolerance information) for the buffered data. For example, the latency information may include a respective latency tolerance (e.g., a maximum tolerable latency) for the buffered data for each of the multiple respective access categories. In one or more implementations, the B SR may be included in an A-control field of a communication to the wireless access point 304 (e.g., as discussed in further detail hereinafter in connection with FIG. 11) and/or in one or more quality-of-service (QoS) fields (e.g., as discussed in further detail hereinafter in connection with FIG. 12).

The wireless access point 304 may then receive a request signal (e.g., a trigger frame, such as a BSRP) from the wireless access point 308 and, responsively, compute (902) an uplink Hop1 latency-guidance buffer status report, a downlink Hop1 latency-guidance buffer status report, and an S-AP uplink Hop2 latency-guidance buffer status report. For example, the uplink Hop1 latency-guidance buffer status report may include (i) buffer information, such as a sum, over all of the client devices connected to the wireless access point 304, of the buffer sizes for the buffered data for uplink in each of the access categories (e.g., a total uplink buffer size for one or more client devices including the client device), and (ii) latency information, such as a minimum of the latency tolerances (e.g., the maximum tolerable latencies) for each of the access categories across all of the client devices connected to the wireless access point 304 (e.g., an uplink client latency tolerance for the one or more client devices including the client device).

For example, the downlink Hop1 latency-guidance buffer status report may include (i) buffer information, such as a sum, over all of the client devices connected to the wireless access point 304, of the buffer sizes for the buffered data for downlink at the wireless access point 304 (e.g., a total downlink buffer size for the one or more client devices including the client device), and (ii) latency information, such as a minimum of the latency tolerances (e.g., the maximum tolerable latencies) for downlink for each of the access categories across all of the client devices connected to the wireless access point 304 (e.g., a downlink client latency tolerance for the one or more client devices including the client device).

In one or more implementations, the S-AP uplink Hop2 latency-guidance buffer status report may include (i) buffer information, such as a buffer size for buffered data at the wireless access point 304 for uplink in each of the access categories (e.g., an access point buffer size), and (ii) latency information, such as a minimum of the latency tolerances (e.g., the maximum tolerable latencies) for the buffered data for uplink at the wireless access point 304 for each of the access categories (e.g., an access point latency).

As shown in FIG. 9, the wireless access point 304 may transmit, to the wireless access point 308, a response to the request signal (e.g., the BSRP) from the wireless access point 308, the response including the computed values of the UL Hop1 latency-guidance BSR, the DL Hop1 latency-guidance BSR, and the S-AP UL Hop2 latency-guidance BSR (e.g., including the total uplink buffer size, the uplink client latency tolerance, the total downlink buffer size, the downlink client latency tolerance, the access point buffer size, and the access point latency tolerance). In one or more implementations, the UL Hop1 L-G BSR and the DL Hop1 L-G BSR values may be reported using one or more data structures that include a scaling factor (SF), such as a two-bit scaling factor, one or more reserve bits, and respective unscaled values that, when combined (e.g., multiplied) with the SF (or a number that is derived from the scaling factor), indicate the QS of the voice category, the QS of the video category, the QS of the background category, the QS of the best effort category, the latency tolerance (e.g., maximum tolerable latency) of the voice category, the latency tolerance (e.g., maximum tolerable latency) of the video category, the latency tolerance (e.g., maximum tolerable latency) of the background category, and the latency tolerance (e.g., maximum tolerable latency) of the best effort category. In one or more implementations, the S-AP uplink Hop2 L-G BSR may be transmitted in an A-control field of a PPDU (e.g., using a data structure similar to the data structure described hereinafter in connection with FIG. 11).

The wireless access point 308 may then obtain (904) a C-AP UL L-G Hop2 BSR and a DL L-G Hop2 latency-guidance BSR (e.g., based in part on the UL Hop1 L-G BSR, the DL Hop1 L-G BSR, and the S-AP UL Hop2 L-G BSR). For example, the C-AP UL Hop2 L-G BSR may include (i) the buffer information provided in the S-AP UL Hop2 BSR, such as a buffer size (e.g., QS) for buffered data at the wireless access point 304 for uplink in each of the access categories (e.g., an uplink buffer size for the wireless access point), and (ii) the latency information provided in the S-AP UL Hop2 BSR, such as a minimum of the latency tolerances (e.g., the maximum tolerable latencies) for the buffered data for uplink at the wireless access point 304 for each of the access categories (e.g., uplink latency tolerance for the wireless access point). For example, the DL Hop2 L-G BSR may be computed at the wireless access point 308 and may include (i) buffer information, such as a buffer size (e.g., QS) for buffered data at the wireless access point 308 for downlink to the wireless access point 304 in each of the access categories (e.g., a downlink buffer size for the wireless access point), and (ii) latency information, such as a minimum of the latency tolerances (e.g., the maximum tolerable latencies) for the buffered data at the wireless access point 308 for downlink to the wireless access point 304 for each of the access categories (e.g., a downlink latency tolerance for the wireless access point).

The wireless access point 308 may then contend for medium access to obtain a TXOP. As shown in FIG. 9, the wireless access point 308 may then allocate channel resources (e.g., a portion of the transmission opportunity) to the wireless access point 304 (and/or to one or more other wireless access points) and/or to the electronic device 300 (e.g., and/or one or more other client devices in communication with the wireless access point 304) based on the C-AP UL L-G Hop2 BSR and the DL L-G Hop2 BSR (e.g., based on the access point buffer size, the access point latency tolerance, the downlink buffer size, and/or the downlink latency tolerance for the wireless access point).

In one or more implementations, the wireless access point 308 and/or the wireless access point 304 may allocate at least some of the portion of the transmission opportunity that is allocated to the wireless access point 304 to the electronic device 300 based on the UL Hop1 L-G BSR, the DL L-G Hop1 BSR, and the S-AP L-G UL Hop2 BSR.

Figure 10:
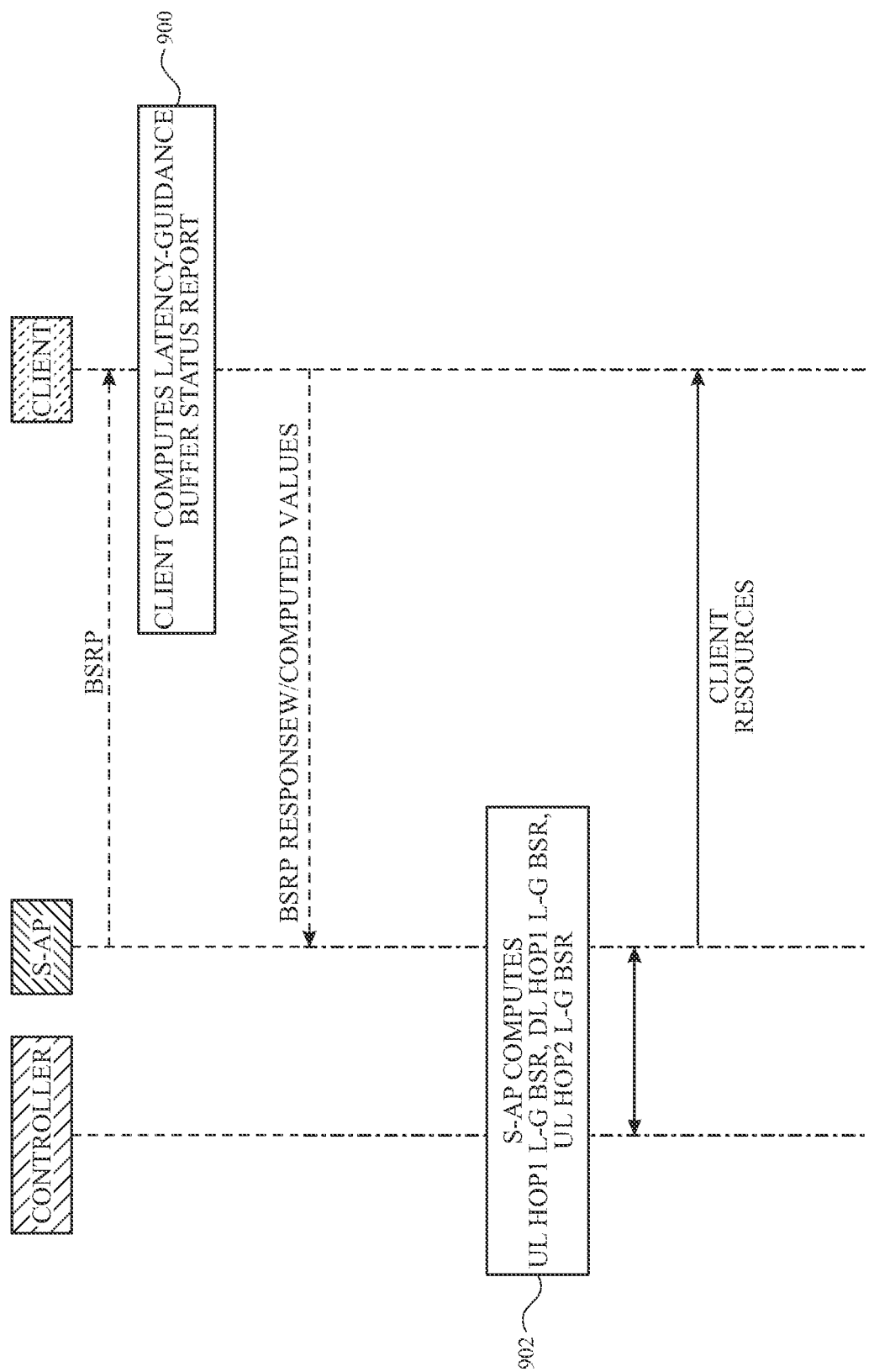
FIG. 10 illustrates an example timing diagram for channel resource allocation operations with latency guidance in the architecture of FIG. 4 in accordance with one or more implementations.

FIG. 10 illustrates a timing diagram showing operations for channel resource allocation with latency guidance, in the example architecture of FIG. 4. As shown in FIG. 10, as in FIG. 9, the electronic device 300 may compute 900 a L-G BSR for the electronic device 300 and send the L-G BSR to the wireless access point 304 in response to a request signal (e.g., a trigger frame such as a BSRP) from the wireless access point 304. As in FIG. 9, in FIG. 10, the wireless access point 304 may compute an UL Hop1 L-G BSR, a DL Hop1 L-G BSR, and a S-AP UL Hop2 L-G BSR. However, in FIG. 10, the wireless access point 304 contends for channel access to obtain a transmission opportunity, and allocates client resources (e.g., at least a portion of the transmission opportunity) to the electronic device 300 based on the L-G BSR of the electronic device 300, the UL L-G Hop1 BSR, the DL Hop1 L-G BSR, and/or the S-AP UL Hop2 L-G BSR. In one or more implementations, the wireless access point 304 may determine how to allocate the client resources based on the L-G BSR of the electronic device 300, the UL Hop1 L-G BSR, the DL Hop1 L-G BSR, and/or the S-AP UL Hop2 L-G BSR. In one or more other implementations, the wireless access point 304 may communicate with the controller 400 to determine how to allocate the client resources based on the L-G B SR of the electronic device 300, the UL Hop1 L-G BSR, the DL Hop1 L-G BSR, and/or the S-AP UL Hop2 L-G BSR (e.g., the controller 400 may determine, based at least in part on the latency information received from the S-AP, how to allocate the client resources and may instruct the wireless access point how to allocate the client resources).

Figure 11:
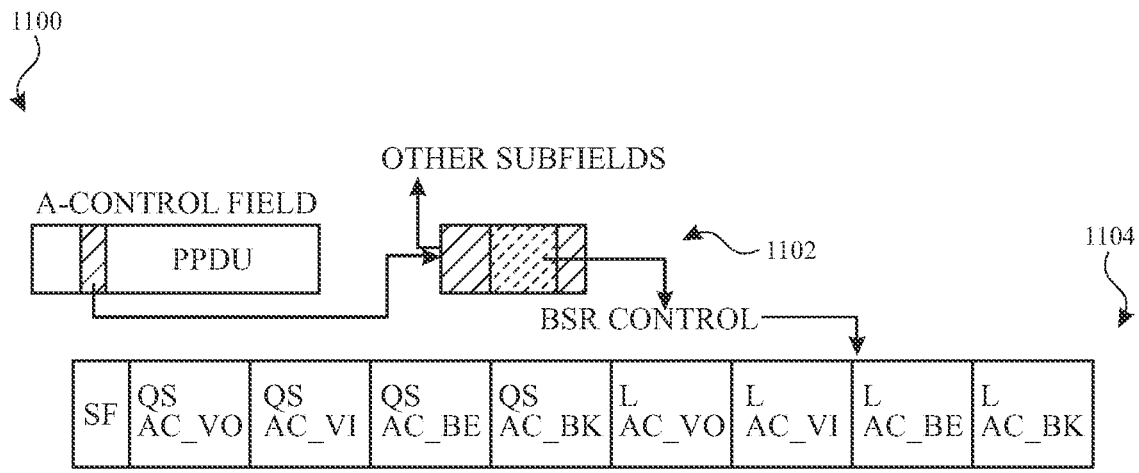
FIG. 11 illustrates an example of buffer size information and latency information in accordance with one or more implementations.

As discussed herein, the L-G B SR may be included in an A-control field of a communication to the wireless access point 304 (e.g., as discussed in further detail hereinafter in connection with FIG. 11) and/or in one or more quality-of-service (QoS) fields (e.g., as discussed in further detail hereinafter in connection with FIG. 12). For example, FIG. 11 illustrates how the L-G BSR (e.g., including the buffer size for each access category (AC) for the electronic device 300 and the latency tolerance for each access category) may be transmitted as one of one or more subfields 1102 of an A-control field of a PPDU 1100. For example, as shown, the L-G BSR may be represented in a data structure 1104 that includes a scaling factor (SF), and unscaled values for: a buffer size for the voice access category (QS AC_VO), a buffer size for the video access category (QS AC_VI), a buffer size for the best effort category (QS AC_BE), a buffer size for the background access category (QS AC_BK), a latency tolerance (e.g., a maximum tolerable latency) for the voice access category (L AC_VO), a latency tolerance (e.g., a maximum tolerable latency) for the video access category (L AC_VI), a latency tolerance (e.g., a maximum tolerable latency) for the best effort access category (L AC_BE), and a latency tolerance (e.g., a maximum tolerable latency) for the background category (L AC_BK). The respective buffer sizes and latency tolerances can be obtained by combining (e.g., multiplying) these respective unscaled values with a value that is based on the scaling factor.

For example, in one or more implementations, the scaling factor for the buffer sizes may be interpreted differently from the scaling factor for the latency tolerances. For example, in one illustrative implementation, scaling factor integer values of, e.g., 0, 1, 2, 3, etc. may represent, for the buffer sizes (QSs), exponent values (e.g., exponents of the number sixteen), and the unscaled QS values may be integer values that represent different exponent values (e.g., exponents of the number two). For example, in one illustrative implementation, scaling factor integer values of, e.g., 0, 1, 2, 3, etc. may represent, for the latency tolerances (Ls), values such as 10, 20, 40, 80, etc., and the unscaled L values may be integer values that represent exponent values (e.g., exponents of the number two). In one or more implementations, the S-AP UL Hop2 L-G BSR may also be represented by a data structure similar to the data structure 1104.

Figure 12:
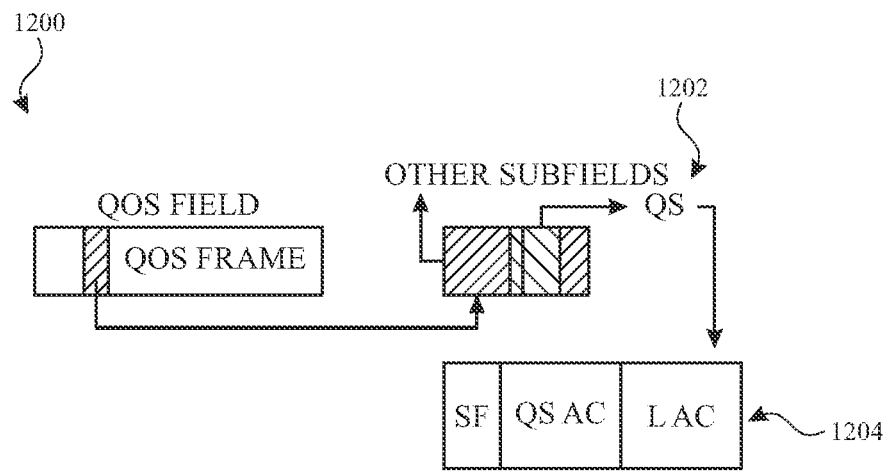
FIG. 12 illustrates another example of buffer size information and latency information in accordance with one or more implementations.

As another example for how the values of the LG-BSR may be transmitted from the electronic device 300 to the wireless access point 304, FIG. 12 illustrates how the values of the LG-BSR can be transmitted in one or more quality-of-service (QoS) fields of a QoS frame 1200. As shown, one or more subfields of a QoS field 1202 of a QoS frame 1200 may include a data structure 1204 that includes a scaling factor (SF), a buffer size (QS_AC) for the access category to which the QoS frame corresponds, and a latency tolerance (L_AC), such as a maximum tolerable latency, for the access category to which the QoS frame corresponds. In this example, a QoS frame for each access category may carry the LG-BSR information (e.g., the buffer size QS_AC and the latency tolerance L_AC) for that access category.

Figure 13:
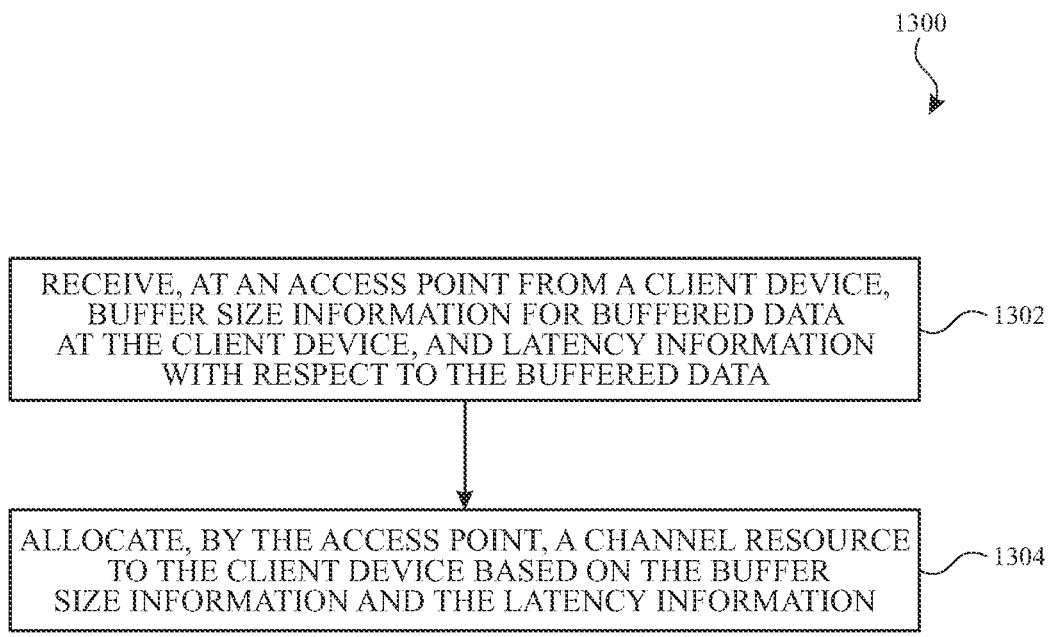
FIG. 13 illustrates a flow diagram of an example process that can be performed for wireless communication with latency guidance in accordance with one or more implementations.

FIG. 13 illustrates a flow diagram of an example process 1300 for wireless communication in accordance with one or more implementations. For explanatory purposes, the process 1300 is primarily described herein with reference to the electronic device 300 and the wireless access point 304 of FIGS. 3 and 4. However, the process 1300 is not limited to the electronic device 300 and the wireless access point 304 of FIGS. 3 and 4, and one or more blocks (or operations) of the process 1300 may be performed by one or more other suitable devices. Further for explanatory purposes, the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

At block 1302, a wireless access point (e.g., a S-AP, such as the wireless access point 304) may receive, from a client device (e.g., the electronic device 300), buffer size information for buffered data at the client device, and latency information with respect to the buffered data. For example, the buffer size information and the latency information may be received in a latency-guidance buffer status report (L-G BSR) as described herein. For example, the latency information may include a respective latency tolerance (e.g., L AC_*) for transmission of the buffered data in each of several respective access categories (e.g., a voice category, a video category, a best effort category, and a background category). For example, the buffer size information may include a buffer size for each of the several respective access categories.

At block 1304, the wireless access point may allocate a channel resource to the client device based on the buffer size information and the latency information. For example, the channel resource may be a portion of a transmission opportunity (TXOP) obtained by the wireless access point or another wireless access point. Example allocations of a channel resource are described herein in connection with FIGS. 5 and 6.

In one or more implementations, the wireless access point may, prior to allocating the channel resource: determine a total uplink buffer size for one or more client devices including the client device using the buffer size information, determine an uplink client latency tolerance for the one or more client devices including the client device using the latency information, determine a total downlink buffer size for the one or more client devices including the client device, and determine a downlink client latency tolerance for the one or more client devices including the client device. In these implementations, allocating the channel resource may include allocating the channel resource based, at least in part, on the total uplink buffer size, the uplink client latency tolerance, the total downlink buffer size, and the downlink client latency tolerance. In one or more implementations, the wireless access point may also, prior to allocating the channel resource: determine an access point buffer size for the wireless access point, and determine an access point latency tolerance for the wireless access point. In these implementations, allocating the channel resource may include allocating the channel resource based, at least in part, on the total uplink buffer size, the uplink client latency tolerance, the total downlink buffer size, the downlink client latency tolerance, the access point buffer size, and/or the access point latency tolerance.

For example, total uplink buffer size for the one or more client devices including the client device may include a sum of uplink buffer sizes for each access category over all of the one or more client devices, the uplink client latency tolerance for the one or more client devices including the client device may include a minimum of the latency tolerances (e.g., a minimum one of the maximum tolerable latencies) for each access category over all of the one or more client devices, total downlink buffer size for the one or more client devices including the client device may include a sum of downlink buffer sizes for each access category over all of the one or more client devices, and the downlink client latency tolerance for the one or more client devices including the client device may include a minimum of the latency tolerances (e.g., a minimum one of the maximum tolerable latencies) for each access category over all of the one or more client devices.

In one or more implementations, the total uplink buffer size for the one or more client devices including the client device and the uplink client latency tolerance for the one or more client devices including the client device may form an UL Hop1 L-G BSR as described herein. In one or more implementations, the total downlink buffer size for the one or more client devices including the client device and the downlink client latency tolerance for the one or more client devices including the client device may form a DL Hop1 L-G BSR as described herein. In one or more implementations, the access point buffer size, and the access point latency tolerance may form an S-AP UL Hop2 L-G BSR as described herein.

In one or more implementations, allocating the channel resource may include, by the wireless access point, contending for channel access to obtain a transmission opportunity, and allocating a portion of the transmission opportunity to the client device based on the total uplink buffer size, the uplink client latency tolerance, the total downlink buffer size, the downlink client latency tolerance, the access point buffer size, and/or the access point latency tolerance (e.g., as described herein in connection with FIG. 10). For example, allocating the portion of the transmission opportunity may include allocating a first portion of a time of the transmission opportunity (e.g., as in the TDMA allocation 600 of FIG. 6). As another example, allocating the portion of the transmission opportunity may include allocating a first portion of a bandwidth of the transmission opportunity (e.g., as in the FDMA allocation 602 example of FIG. 6).

In one or more implementations, allocating the channel resource may include: providing the total uplink buffer size, the uplink client latency tolerance, the total downlink buffer size, the downlink client latency tolerance, the access point buffer size, and the access point latency tolerance to an other wireless access point (e.g., a C-AP, such as the wireless access point 308), receiving a portion of a transmission opportunity obtained by the other wireless access point, from the other wireless access point responsive to providing the total uplink buffer size, the uplink client latency tolerance, the total downlink buffer size, the downlink client latency tolerance, the access point buffer size, and the access point latency tolerance to the other wireless access point, and allocating at least some of the portion of the transmission opportunity to the client device based on the total uplink buffer size, the uplink client latency tolerance, the total downlink buffer size, the downlink client latency tolerance, the access point buffer size, and the access point latency tolerance (e.g., as described herein connection with FIG. 9). For example, allocating the portion of the transmission opportunity may include allocating a first portion of a time of the transmission opportunity (e.g., as in the TDMA allocation 500 example of FIG. 5). As another example, allocating the portion of the transmission opportunity may include allocating a first portion of a bandwidth of the transmission opportunity (e.g., as in the FDMA allocation 502 example of FIG. 5).

In one or more implementations, the process 1300 may also include, by the other wireless access point: determining a downlink buffer size (e.g., for each access category) for the wireless access point (e.g., for downlink from the other wireless access point to the wireless access point), determining a downlink latency tolerance (e.g., for each access category) for the wireless access point, and allocating the portion of the transmission opportunity to the wireless access point based on the access point buffer size, the access point latency tolerance, the downlink buffer size, and/or the downlink latency tolerance for the wireless access point. For example, the access point buffer size and the access point latency tolerance may form a C-AP UL L-G Hop2 BSR as described herein, and the downlink buffer size for the wireless access point and the downlink latency tolerance for the wireless access point may form a DL L-G Hop2 BSR as described herein.

Figure 14:
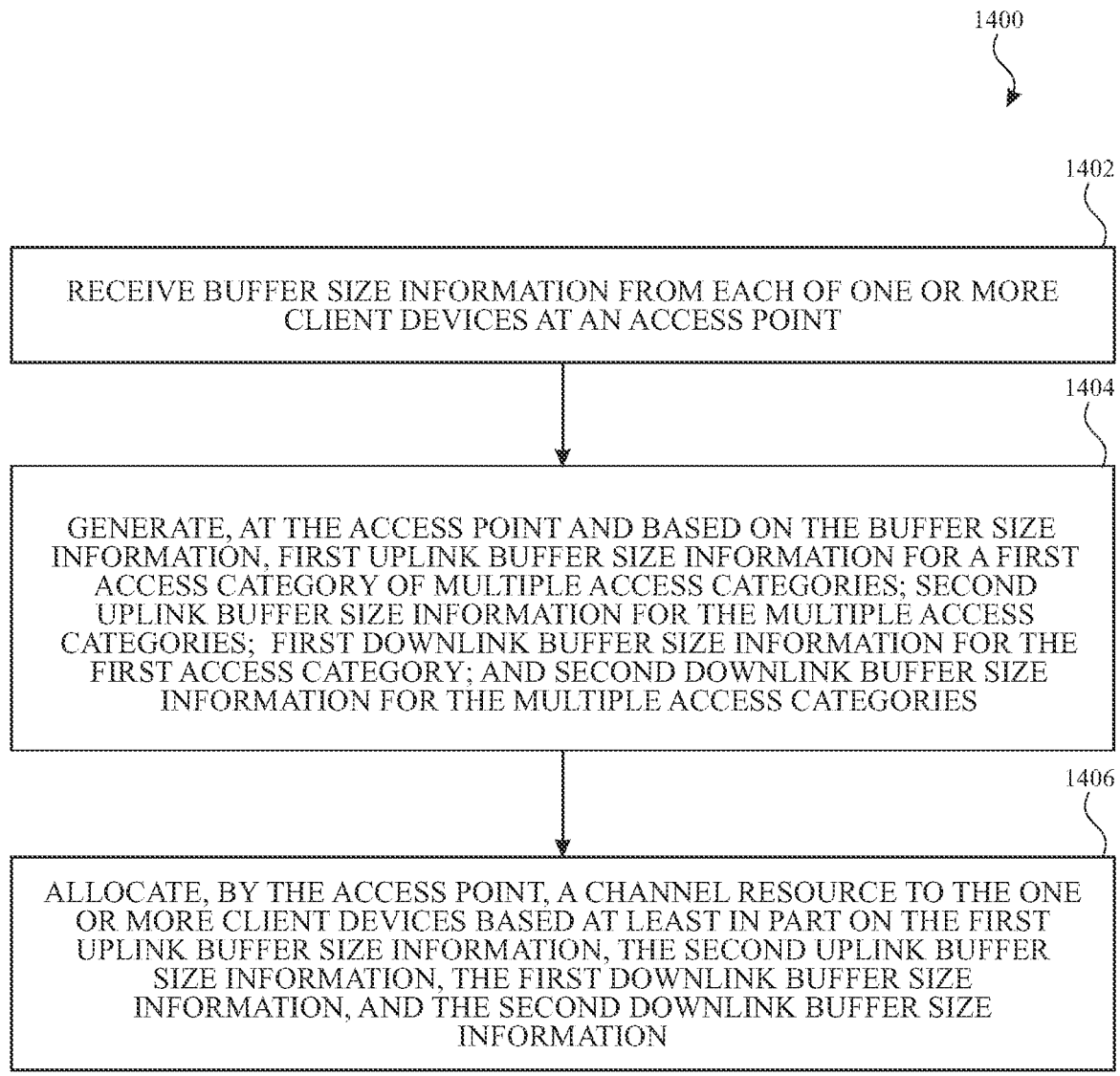
FIG. 14 illustrates a flow diagram of an example process that can be performed for wireless communication in accordance with one or more implementations.

FIG. 14 illustrates a flow diagram of another example process 1400 for wireless communication in accordance with one or more implementations. For explanatory purposes, the process 1400 is primarily described herein with reference to the electronic device 300 and the wireless access point 304 of FIGS. 3 and 4. However, the process 1400 is not limited to the electronic device 300 and the wireless access point 304 of FIGS. 3 and 4, and one or more blocks (or operations) of the process 1400 may be performed by one or more other suitable devices. Further for explanatory purposes, the blocks of the process 1400 are described herein as occurring in serial, or linearly. However, multiple blocks of the process 1400 may occur in parallel. In addition, the blocks of the process 1400 need not be performed in the order shown and/or one or more blocks of the process 1400 need not be performed and/or can be replaced by other operations.

At block 1402, a wireless access point (e.g., an S-AP, such as the wireless access point 304) may receive buffer size information from each of one or more client devices (e.g., including the electronic device 300). For example, the buffer size information may be received in a buffer status report (BSR) as described herein in connection with, for example, FIG. 7 and/or FIG. 8). For example, the buffer size information from each of the one or more client devices may include a buffer size of the high priority access category and a sum of buffer sizes for the multiple access categories including the high priority access category.

At block 1404, the wireless access point may generate, based on the buffer size information: first uplink buffer size information for a first access category of multiple access categories (e.g., for the one or more client devices). The first access category may be a high priority access category having a priority that is higher than respective priorities of remaining access categories of the multiple access categories. The wireless access point may also generate second uplink buffer size information for the multiple access categories (e.g., including the high priority access category for the one or more client devices). The wireless access point may also generate first downlink buffer size information for the first access category (e.g., the high priority access category) for the one or more client devices. The wireless access point may also generate second downlink buffer size information for the multiple access categories (e.g., including the high priority access category) for the one or more client devices. In one or more implementations, the first uplink buffer size information and the second uplink buffer size information may be included in an UL Hop1 BSR as described herein. In one or more implementations, the first downlink buffer size information and the second downlink buffer size information may be included in a DL Hop1 BSR as described herein.

For example, the first uplink buffer size information may include a sum of uplink buffer sizes for the high priority access category over all of the one or more client devices, the second uplink buffer size information may include a sum of uplink buffer sizes over all access categories over all of the one or more client devices, the first downlink buffer size information may include a sum of downlink buffer sizes for the high priority access category over all of the one or more client devices, and the second downlink buffer size information may include a sum of downlink buffer sizes over all access categories over all of the one or more client devices.

At block 1406, the wireless access point may allocate a channel resource to the one or more client devices based at least in part on the first uplink buffer size information, the second uplink buffer size information, the first downlink buffer size information, and the second downlink buffer size information. For example, the channel resource may be a portion of a transmission opportunity (TXOP) obtained by the wireless access point or another wireless access point. Example allocations of a channel resource are described herein in connection with FIGS. 5 and 6.

In one or more implementations, wireless access point may also generate (e.g., compute) third uplink buffer size information for the high priority access category for the wireless access point and fourth uplink buffer size information for the multiple access categories including the high priority access category for the wireless access point, and allocate the channel resource to the one or more client devices based on the first uplink buffer size information, the second uplink buffer size information, the first downlink buffer size information, the second downlink buffer size information, the third uplink buffer size information, and/or the fourth uplink buffer size information. In one or more implementations, the third uplink buffer size information for the high priority access category for the wireless access point and the fourth uplink buffer size information for the multiple access categories including the high priority access category for the wireless access point may be included in a S-AP UL Hop2 BSR, as described herein. For example, the third uplink buffer size information for the high priority access category for the wireless access point may include a buffer size for the high priority access category for uplink at the wireless access point. For example, the fourth uplink buffer size information for the multiple access categories including the high priority access category for the wireless access point may include a sum of the buffer sizes over all of the multiple access categories for uplink at the wireless access point.

In one or more implementations, allocating the channel resource may include, by the wireless access point, contending for channel access to obtain a transmission opportunity, and allocating at least a portion of the transmission opportunity to at least one of the one or more client devices based on the first uplink buffer size information, the second uplink buffer size information, the first downlink buffer size information, the second downlink buffer size information, the third uplink buffer size information, and/or the fourth uplink buffer size information (e.g., as described herein in connection with FIG. 8). For example, allocating at least the portion of the transmission opportunity may include allocating a first portion of a time of the transmission opportunity (e.g., as in the TDMA allocation 600 of FIG. 6). As another example, allocating at least the portion of the transmission opportunity may include allocating a first portion of a bandwidth of the transmission opportunity (e.g., as in the FDMA allocation 602 of FIG. 6).

In one or more implementations, allocating the channel resource may also include, by the wireless access point, providing the first uplink buffer size information, the second uplink buffer size information, the first downlink buffer size information, the second downlink buffer size information, the third uplink buffer size information, and the fourth uplink buffer size information to another wireless access point (e.g., a C-AP, such as the wireless access point 308), receiving a portion of a transmission opportunity, obtained by the other wireless access point, from the other wireless access point responsive to providing the first uplink buffer size information, the second uplink buffer size information, the first downlink buffer size information, the second downlink buffer size information, the third uplink buffer size information, and the fourth uplink buffer size information to the other wireless access point, and allocating at least some of the portion of the transmission opportunity to at least one of the one or more client devices based on the first uplink buffer size information, the second uplink buffer size information, the first downlink buffer size information, the second downlink buffer size information, the third uplink buffer size information, and/or the fourth uplink buffer size information (e.g., as described herein in connection with FIG. 7).

In one or more implementations, the process 1400 may also include, by the other wireless access point: determining a third downlink buffer size of the high priority access category of the wireless access point, determining a sum of downlink buffer sizes of the multiple access categories including the high priority access category at the wireless access point, contending for channel access to obtain a transmission opportunity, and allocating the portion of the transmission opportunity to the wireless access point based on the third uplink buffer size information, the fourth uplink buffer size information, the third downlink buffer size, and/or the sum of the downlink buffer sizes (e.g., as described herein in connection with FIG. 7). In one or more implementations, the third uplink buffer size information and the fourth uplink buffer size information may form a C-AP UL Hop2 BSR as described herein. In one or more implementations, the third downlink buffer size, and the sum of the downlink buffer sizes may form a DL Hop2 BSR as described herein.

Figure 15:
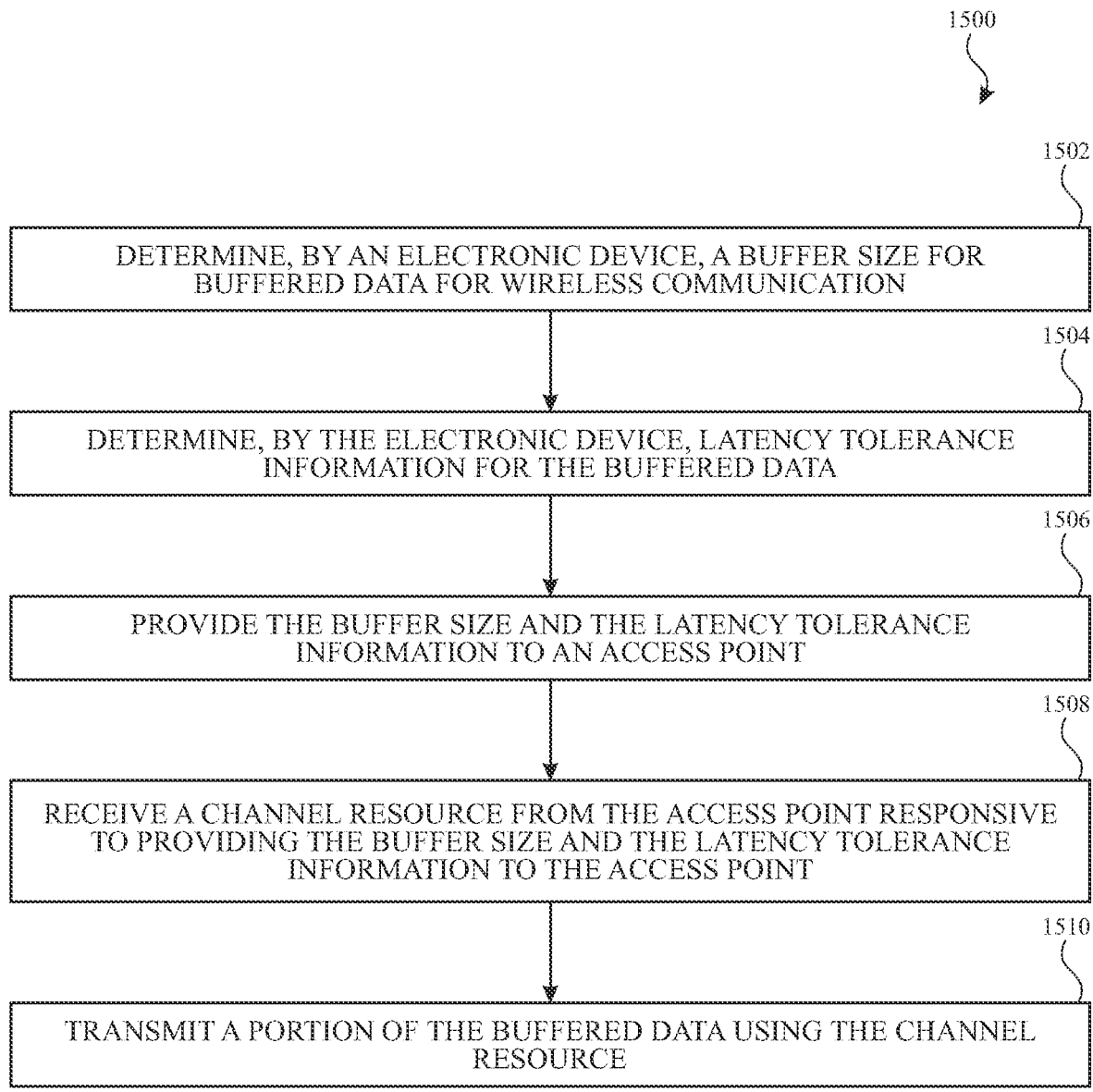
FIG. 15 illustrates a flow diagram of an example process that can be performed for wireless communication with latency guidance in accordance with one or more implementations.

FIG. 15 illustrates a flow diagram of another example process 1500 for wireless communication in accordance with one or more implementations. For explanatory purposes, the process 1500 is primarily described herein with reference to the electronic device 300 and the wireless access point 304 of FIGS. 3 and 4. However, the process 1500 is not limited to the electronic device 300 and the wireless access point 304 of FIGS. 3 and 4, and one or more blocks (or operations) of the process 1500 may be performed by one or more other suitable devices. Further for explanatory purposes, the blocks of the process 1500 are described herein as occurring in serial, or linearly. However, multiple blocks of the process 1500 may occur in parallel. In addition, the blocks of the process 1500 need not be performed in the order shown and/or one or more blocks of the process 1500 need not be performed and/or can be replaced by other operations.

At block 1502, processing circuitry (e.g., host processor 202) of an apparatus of a client device (e.g., a client device, such as the electronic device 300) may determine a buffer size for buffered data (e.g., at the client device) for wireless communication. For example, the buffer size may include a QS of a high priority access category. The buffer size may also include a sum of QSs over multiple access categories (e.g., including a voice category, a video category, a best effort category, and a background category).

At block 1504, the processing circuitry may determine latency tolerance information for the buffered data. For example, the latency tolerance information may include a respective latency tolerance (e.g., a respective maximum latency tolerance) for each of multiple respective access categories (e.g., as described herein in connection with FIG. 9 and/or FIG. 10).

At block 1506, the processing circuitry may configure radio frequency (RF) circuitry (e.g., RF circuitry 206) to transmit a response signal to a wireless access point (e.g., the wireless access point 304). For example, the response signal may include the buffer size and the latency tolerance information. For example, the buffer size and the latency tolerance information may be provided to the wireless access point in an A-control field or one or more QoS subfields of a PPDU, as described herein in connection with FIGS. 11 and/or 12.

At block 1508, the processing circuitry may receive, via the RF circuitry, a channel resource from the wireless access point responsive to transmitting the buffer size and the latency tolerance information to the wireless access point. For example, the channel resource may be a portion of a TXOP (e.g., as described in the examples of FIGS. 5 and 6) obtained by the wireless access point or another wireless access point that is in communication with the wireless access point.

At block 1510, the processing circuitry may configure the RF circuitry to transmit a portion of the buffered data (e.g., from the client device) using the channel resource. For example, the portion of the buffered data may include buffered data for one of the multiple respective access categories (e.g., a latency sensitive one) for which the buffered data is latency sensitive (e.g., has a maximum tolerable latency that is lower than the maximum tolerable latencies of buffered data in other access categories and/or at other client devices). For example, the portion of the TXOP allocated to the client device based on the buffer size and the latency information may be a portion that has been determined by the wireless access point, another wireless access point, and/or a controller (e.g., as described herein in connection with FIGS. 9, 10, 11, 12, and/or 13) to be sufficient to drain the buffered data for the one of the multiple respective access categories for which the buffered data is latency sensitive, but insufficient to also drain buffered data for one or more others of the multiple respective access categories. As another example, the portion of the buffered data may include buffered data for two or three of the multiple respective access categories for which the buffered data is latency sensitive (e.g., that have a maximum tolerable latency that is lower than the maximum tolerable latencies of buffered data in other access categories and/or at other client devices). For example, the portion of the TXOP allocated to the client device based on the buffer size and the latency information may be a portion that has been determined by the wireless access point, another wireless access point, and/or a controller (e.g., as described herein in connection with FIGS. 9, 10, 11, 12, and/or 13) to be sufficient to drain the buffered data for the two or three of the multiple respective access categories for which the buffered data is latency sensitive, but insufficient to also drain buffered data for one or more others of the multiple respective access categories. In one or more implementations, channel resources may then be allocated to other client devices for transmission of the next lowest maximum latency tolerance data, and then to the client device for transmission in the one or more others of the multiple respective access categories.

Aspects of the present technology may include the gathering and use of data available from specific and legitimate sources for wireless communication. The present disclosure contemplates that in some instances, this gathered data may include personal information data that uniquely identifies or can be used to identify a specific person. Such personal information data can include image data, video data, audio data, demographic data, location-based data, online identifiers, telephone numbers, email addresses, home addresses, device identifiers, data or records relating to a user's health or level of fitness (e.g., vital signs measurements, medication information, exercise information, EMG signals), date of birth, or any other personal information.

The present disclosure recognizes that the use of such personal information data, in the present technology, can be used to the benefit of users. For example, the personal information data can be transmitted in wireless communication. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, in the case of wireless communication, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 16:
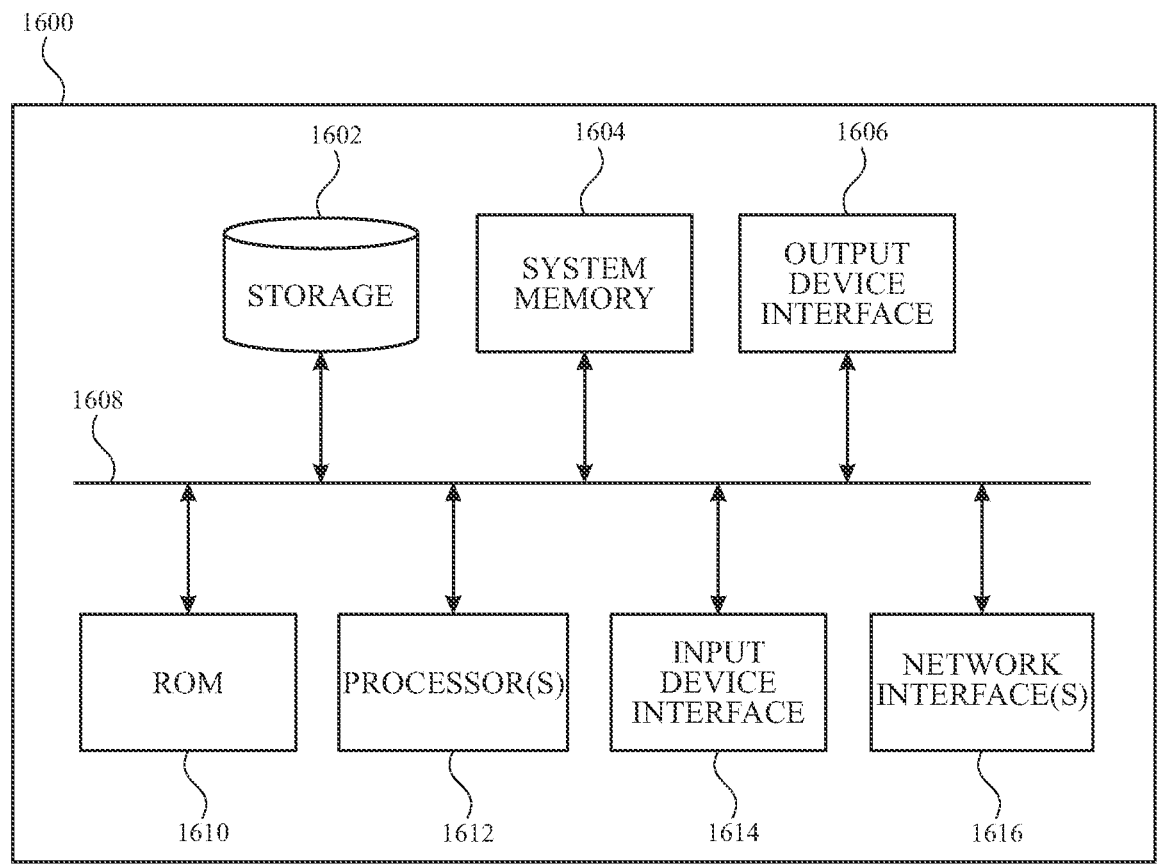
FIG. 16 illustrates an example electronic system with which aspects of the subject technology may be implemented in accordance with one or more implementations.

FIG. 16 illustrates an electronic system 1600 with which one or more implementations of the subject technology may be implemented. The electronic system 1600 can be, and/or can be a part of, one or more of the electronic devices 102A, 102B, or 102C shown in FIG. 1. The electronic system 1600 may include various types of computer readable media and interfaces for various other types of computer readable media. The electronic system 1600 includes a bus 1608, one or more processing unit(s) 1612, a system memory 1604 (and/or buffer), a ROM 1610, a permanent storage device 1602, an input device interface 1614, an output device interface 1606, and one or more network interfaces 1616, or subsets and variations thereof.

The bus 1608 collectively represents all system, peripheral, and chipset buses that communicatively connect the numerous internal devices of the electronic system 1600. In one or more implementations, the bus 1608 communicatively connects the one or more processing unit(s) 1612 with the ROM 1610, the system memory 1604, and the permanent storage device 1602. From these various memory units, the one or more processing unit(s) 1612 retrieves instructions to execute and data to process in order to execute the processes of the subject disclosure. The one or more processing unit(s) 1612 can be a single processor or a multi-core processor in different implementations.

The ROM 1610 stores static data and instructions that are needed by the one or more processing unit(s) 1612 and other modules of the electronic system 1600. The permanent storage device 1602, on the other hand, may be a read-and-write memory device. The permanent storage device 1602 may be a non-volatile memory unit that stores instructions and data even when the electronic system 1600 is off. In one or more implementations, a mass-storage device (such as a magnetic or optical disk and its corresponding disk drive) may be used as the permanent storage device 1602.

In one or more implementations, a removable storage device (such as a floppy disk, flash drive, and its corresponding disk drive) may be used as the permanent storage device 1602. Like the permanent storage device 1602, the system memory 1604 may be a read-and-write memory device. However, unlike the permanent storage device 1602, the system memory 1604 may be a volatile read-and-write memory, such as random access memory. The system memory 1604 may store any of the instructions and data that one or more processing unit(s) 1612 may need at runtime. In one or more implementations, the processes of the subject disclosure are stored in the system memory 1604, the permanent storage device 1602, and/or the ROM 1610. From these various memory units, the one or more processing unit(s) 1612 retrieves instructions to execute and data to process in order to execute the processes of one or more implementations.

The bus 1608 also connects to the input and output device interfaces 1614 and 1606. The input device interface 1614 enables a user to communicate information and select commands to the electronic system 1600. Input devices that may be used with the input device interface 1614 may include, for example, alphanumeric keyboards and pointing devices (also called "cursor control devices"). The output device interface 1606 may enable, for example, the display of images generated by electronic system 1600. Output devices that may be used with the output device interface 1606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 16, the bus 1608 also couples the electronic system 1600 to one or more networks and/or to one or more network nodes, such as the AP 104 and/or the base station 106 shown in FIG. 1, through the one or more network interface(s) 1616. As shown in FIG. 16, the network interface(s) 1616 may include a WiFi communications interface (e.g., a WiFi module, which may include one or more WiFi antennas and/or front end circuitry configured to receive and transmit wireless signals in one or more WiFi channels as discussed herein). The network interface(s) 1616 may also include one or more of a Bluetooth communication interface, a cellular interface, an NFC interface, a Zigbee communication interface, a WLAN communication interface, a USB communication interface, or generally any communication interface. In this manner, the electronic system 1600 can be a part of a network of computers (such as a LAN, a wide area network ("WAN"), or an Intranet, or a network of networks, such as the Internet. Any or all components of the electronic system 1600 can be used in conjunction with the subject disclosure.

In accordance with aspects of the disclosure, a method is provided that includes receiving, at a wireless access point from a client device: buffer size information for buffered data at the client device, and latency information with respect to the buffered data; and allocating, by the wireless access point, a channel resource to the client device based on the buffer size information and the latency information.

In accordance with aspects of the disclosure, a method is provided that includes receiving buffer size information from each of one or more client devices at a wireless access point; generating, at the wireless access point and based on the buffer size information: first uplink buffer size information for a first access category of multiple access categories for the one or more client devices, the first access category being a high priority access category having a priority that is higher than respective priorities of remaining access categories of the multiple access categories; second uplink buffer size information for the multiple access categories including the high priority access category for the one or more client devices; first downlink buffer size information for the high priority access category for the one or more client devices; and second downlink buffer size information for the multiple access categories including the high priority access category for the one or more client devices; and allocating, by the wireless access point, a channel resource to the one or more client devices based at least in part on the first uplink buffer size information, the second uplink buffer size information, the first downlink buffer size information, and the second downlink buffer size information.

In accordance with aspects of the disclosure, a method is provided that includes determining, by an electronic device, a buffer size for buffered data for wireless communication; determining, by the electronic device, latency tolerance information for the buffered data; providing the buffer size and the latency tolerance information to a wireless access point; receiving a channel resource from the wireless access point responsive to providing the buffer size and the latency tolerance information to the wireless access point; and transmitting a portion of the buffered data using the channel resource.

In accordance with aspects of the disclosure, an apparatus of a client device is provided, the apparatus including processing circuitry configured to: determine a buffer size for buffered data for wireless communication; determine latency tolerance information for the buffered data; configure radio frequency (RF) circuitry to transmit a response signal to a wireless access point, the response signal including the buffer size and the latency tolerance information; receive, via the RF circuitry, a channel resource from the wireless access point responsive to transmitting the buffer size and the latency tolerance information to the wireless access point; and configure the RF circuitry to transmit a portion of the buffered data using the channel resource Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving buffer size information from each of one or more client devices at a wireless access point;
   generating, at the wireless access point and based on the buffer size information:
      first uplink buffer size information for a first access category of multiple access categories for the one or more client devices, the first access category being a high priority access category having a priority that is higher than respective priorities of remaining access categories of the multiple access categories;
      second uplink buffer size information for the multiple access categories including the high priority access category for the one or more client devices;
      first downlink buffer size information for the high priority access category for the one or more client devices; and
      second downlink buffer size information for the multiple access categories including the high priority access category for the one or more client devices; and
   allocating, by the wireless access point, a channel resource to the one or more client devices based at least in part on the first uplink buffer size information, the second uplink buffer size information, the first downlink buffer size information, and the second downlink buffer size information.

2. The method of claim 1, further comprising:
   generating, by the wireless access point, third uplink buffer size information for the high priority access category for the wireless access point and fourth uplink buffer size information for the multiple access categories including the high priority access category for the wireless access point; and
   allocating the channel resource to the one or more client devices based on the first uplink buffer size information, the second uplink buffer size information, the first downlink buffer size information, the second downlink buffer size information, the third uplink buffer size information, and the fourth uplink buffer size information.

3. The method of claim 2, wherein allocating the channel resource further comprises, by the wireless access point:
   contending for channel access to obtain a transmission opportunity; and
   allocating at least a portion of the transmission opportunity to at least one of the one or more client devices based on the first uplink buffer size information, the second uplink buffer size information, the first downlink buffer size information, the second downlink buffer size information, the third uplink buffer size information, and the fourth uplink buffer size information.

4. The method of claim 3, wherein allocating at least the portion of the transmission opportunity comprises allocating a first portion of a time of the transmission opportunity.

5. The method of claim 3, wherein allocating at least the portion of the transmission opportunity comprises allocating a first portion of a bandwidth of the transmission opportunity.

6. The method of claim 2, wherein allocating the channel resource further comprises, by the wireless access point:
   providing the first uplink buffer size information, the second uplink buffer size information, the first downlink buffer size information, the second downlink buffer size information, the third uplink buffer size information, and the fourth uplink buffer size information to an other wireless access point;
   receiving a portion of a transmission opportunity obtained by the other wireless access point, from the other wireless access point responsive to providing the first uplink buffer size information, the second uplink buffer size information, the first downlink buffer size information, the second downlink buffer size information, the third uplink buffer size information, and the fourth uplink buffer size information to the other wireless access point; and
   allocating at least some of the portion of the transmission opportunity to at least one of the one or more client devices based, at least in part, on the first uplink buffer size information, the second uplink buffer size information, the first downlink buffer size information, the second downlink buffer size information, the third uplink buffer size information, and the fourth uplink buffer size information.

7. The method of claim 6, further comprising, by the other wireless access point:
   determining a third downlink buffer size of the high priority access category of the wireless access point;
   determining a sum of downlink buffer sizes of the multiple access categories including the high priority access category at the wireless access point;
   contending for channel access to obtain the transmission opportunity; and allocating the portion of the transmission opportunity to the wireless access point based, at least in part, on the third uplink buffer size information, the fourth uplink buffer size information, the third downlink buffer size, and the sum of the downlink buffer sizes.

8. The method of claim 1, wherein the buffer size information from each of the one or more client devices comprises a buffer size of the high priority access category and a sum of buffer sizes for the multiple access categories including the high priority access category.

9. The method of claim 8, wherein the first uplink buffer size information comprises a sum of uplink buffer sizes for the high priority access category over all of the one or more client devices, the second uplink buffer size information comprises a sum of uplink buffer sizes over all access categories over all of the one or more client devices, the first downlink buffer size information comprises a sum of downlink buffer sizes for the high priority access category over all of the one or more client devices, and the second downlink buffer size information comprises a sum of downlink buffer sizes over all access categories over all of the one or more client devices.

10. A device, comprising:
processing circuitry configured to:
receive buffer size information from each of one or more client devices;
generate, based on the buffer size information:
first uplink buffer size information for a first access category of multiple access categories for the one or more client devices, the first access category being a high priority access category having a priority that is higher than respective priorities of remaining access categories of the multiple access categories;
second uplink buffer size information for the multiple access categories including the high priority access category for the one or more client devices;
first downlink buffer size information for the high priority access category for the one or more client devices; and
second downlink buffer size information for the multiple access categories including the high priority access category for the one or more client devices; and
allocate a channel resource to the one or more client devices based at least in part on the first uplink buffer size information, the second uplink buffer size information, the first downlink buffer size information, and the second downlink buffer size information.

11. The device of claim 10, wherein the processing circuitry is further configured to:
generate third uplink buffer size information for the high priority access category for a wireless access point and fourth uplink buffer size information for the multiple access categories including the high priority access category for the wireless access point; and
allocate the channel resource to the one or more client devices based on the first uplink buffer size information, the second uplink buffer size information, the first downlink buffer size information, the second downlink buffer size information, the third uplink buffer size information, and the fourth uplink buffer size information.

12. The device of claim 11, wherein the processing circuitry is configured to allocate the channel resource by:
contending for channel access to obtain a transmission opportunity; and
allocating at least a portion of the transmission opportunity to at least one of the one or more client devices based on the first uplink buffer size information, the second uplink buffer size information, the first downlink buffer size information, the second downlink buffer size information, the third uplink buffer size information, and the fourth uplink buffer size information.

13. The device of claim 12, wherein the processing circuitry is configured to allocate at least the portion of the transmission opportunity by allocating a first portion of a time of the transmission opportunity.

14. The device of claim 12, wherein the processing circuitry is configured to allocate at least the portion of the transmission opportunity by allocating a first portion of a bandwidth of the transmission opportunity.

15. The device of claim 11, wherein the processing circuitry is configured to allocate the channel resource, by:
providing the first uplink buffer size information, the second uplink buffer size information, the first downlink buffer size information, the second downlink buffer size information, the third uplink buffer size information, and the fourth uplink buffer size information to an other wireless access point;
receiving a portion of a transmission opportunity obtained by the other wireless access point, from the other wireless access point responsive to providing the first uplink buffer size information, the second uplink buffer size information, the first downlink buffer size information, the second downlink buffer size information, the third uplink buffer size information, and the fourth uplink buffer size information to the other wireless access point; and
allocating at least some of the portion of the transmission opportunity to at least one of the one or more client devices based, at least in part, on the first uplink buffer size information, the second uplink buffer size information, the first downlink buffer size information, the second downlink buffer size information, the third uplink buffer size information, and the fourth uplink buffer size information.

16. The device of claim 10, wherein the buffer size information from each of the one or more client devices comprises a buffer size of the high priority access category and a sum of buffer sizes for the multiple access categories including the high priority access category.

17. The device of claim 16, wherein the first uplink buffer size information comprises a sum of uplink buffer sizes for the high priority access category over all of the one or more client devices, the second uplink buffer size information comprises a sum of uplink buffer sizes over all access categories over all of the one or more client devices, the first downlink buffer size information comprises a sum of downlink buffer sizes for the high priority access category over all of the one or more client devices, and the second downlink buffer size information comprises a sum of downlink buffer sizes over all access categories over all of the one or more client devices.

18. A non-transitory, computer-readable medium storing instructions which, when executed by one or more processors, cause the one or more processors to:
receive buffer size information from each of one or more client devices;
generate, based on the buffer size information:
first uplink buffer size information for a first access category of multiple access categories for the one or more client devices, the first access category being a high priority access category having a priority that is higher than respective priorities of remaining access categories of the multiple access categories;

second uplink buffer size information for the multiple access categories including the high priority access category for the one or more client devices;

first downlink buffer size information for the high priority access category for the one or more client devices; and second downlink buffer size information for the multiple access categories including the high priority access category for the one or more client devices; and allocate a channel resource to the one or more client devices based at least in part on the first uplink buffer size information, the second uplink buffer size information, the first downlink buffer size information, and the second downlink buffer size information.

19. The non-transitory, computer-readable medium of claim 18, wherein the instructions, when executed by the one or more processors, further cause the one or more processors to:

generate third uplink buffer size information for the high priority access category for a wireless access point and fourth uplink buffer size information for the multiple access categories including the high priority access category for the wireless access point; and allocate the channel resource to the one or more client devices based on the first uplink buffer size information, the second uplink buffer size information, the first downlink buffer size information, the second downlink buffer size information, the third uplink buffer size information, and the fourth uplink buffer size information.

20. The non-transitory, computer-readable medium of claim 19, wherein the instructions, when executed by the one or more processors, further cause the one or more processors to allocate the channel resource by:

contending for channel access to obtain a transmission opportunity; and allocating at least a portion of the transmission opportunity to at least one of the one or more client devices based on the first uplink buffer size information, the second uplink buffer size information, the first downlink buffer size information, the second downlink buffer size information, the third uplink buffer size information, and the fourth uplink buffer size information.

\* \* \* \* \*